United States Patent
Li et al.

(10) Patent No.: US 10,424,380 B1
(45) Date of Patent: Sep. 24, 2019

(54) PHYSICALLY UNCLONABLE FUNCTION (PUF) MEMORY EMPLOYING STATIC RANDOM ACCESS MEMORY (SRAM) BIT CELLS WITH ADDED PASSIVE RESISTANCE TO ENHANCE TRANSISTOR IMBALANCE FOR IMPROVED PUF OUTPUT REPRODUCIBILITY

(71) Applicant: QUALCOMM Incorporated, San Diego, CA (US)

(72) Inventors: Xia Li, San Diego, CA (US); Jianguo Yao, Londonderry, NH (US); Seung Hyuk Kang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/009,351

(22) Filed: Jun. 15, 2018

(51) Int. Cl.

| | |
|---|---|
| *G11C 19/00* | (2006.01) |
| *G11C 14/00* | (2006.01) |
| *H01L 27/22* | (2006.01) |
| *H01L 43/02* | (2006.01) |
| *H04L 9/32* | (2006.01) |
| *G11C 11/16* | (2006.01) |

(Continued)

(52) U.S. Cl.
CPC ........ *G11C 14/0081* (2013.01); *G11C 14/009* (2013.01); *H01L 27/228* (2013.01); *H01L 43/02* (2013.01); *H04L 9/3278* (2013.01); *G11C 11/161* (2013.01); *G11C 11/412* (2013.01); *G11C 11/418* (2013.01); *G11C 11/419* (2013.01)

(58) Field of Classification Search
CPC . G11C 14/0081; G11C 14/009; H01L 27/228; H01L 43/02; H04L 9/3278

USPC .......................................................... 365/156
See application file for complete search history.

(56) References Cited

U.S. PATENT DOCUMENTS

| | | | |
|---|---|---|---|
| 8,218,349 B2 * | 7/2012 | Berger | ..................... G11C 8/04 365/148 |
| 8,516,269 B1 | 8/2013 | Hamlet et al. | |

(Continued)

OTHER PUBLICATIONS

Cortez, Mafalda et al., "Modeling SRAM Start-Up Behavior for Physical Unclonable Functions," 2012 IEEE International Symposium on Defect and Fault Tolerance in VLSI and Nanotechnology Systems (DFT), Oct. 3, 2012, 6 pages.

(Continued)

*Primary Examiner* — Xiaochun L Chen
(74) *Attorney, Agent, or Firm* — Qualcomm Incorporation

(57) ABSTRACT

Physically unclonable function (PUF) memory employing static random access memory (SRAM) bit cells with added passive resistance are disclosed. Added passive resistance can enhance imbalance between transistors in the SRAM bit cell for improved PUF output reproducibility. Enhancing transistor imbalance can more fully skew the SRAM bit cell for increased PUF output reproducibility while still achieving the benefits of output randomness. In one exemplary aspect, added passive resistances in the SRAM bit cell are coupled to a drain of one or more pull-down N-type FETs (NFETs)) in one or more cross-coupled inverters in the SRAM bit cell to enhance imbalance between the inverters. Enhanced imbalance between the inverters increases sensitivity in the output voltage of the SRAM bit cell for a given change in input voltage resulting in greater skew of the SRAM bit cell for increased reproducibility.

31 Claims, 23 Drawing Sheets

(51) Int. Cl.
*G11C 11/412* (2006.01)
*G11C 11/419* (2006.01)
*G11C 11/418* (2006.01)

(56) References Cited

U.S. PATENT DOCUMENTS

| | | | |
|---|---|---|---|
| 9,202,554 B2 | 12/2015 | Chu et al. | |
| 9,489,999 B2 | 11/2016 | Rosenberg et al. | |
| 9,495,627 B1 | 11/2016 | Annunziata et al. | |
| 9,812,184 B2* | 11/2017 | Kent | G11C 11/161 |
| 9,870,811 B2* | 1/2018 | Wang | G11C 11/1675 |
| 2010/0302832 A1* | 12/2010 | Berger | G11C 8/04 |
| | | | 365/80 |
| 2012/0327705 A1* | 12/2012 | Chen | G11C 11/412 |
| | | | 365/156 |
| 2014/0185361 A1* | 7/2014 | Oh | G11C 13/004 |
| | | | 365/148 |
| 2015/0069320 A1* | 3/2015 | Rabkin | H01L 21/02403 |
| | | | 257/5 |
| 2015/0071432 A1* | 3/2015 | Zhu | G11C 11/1673 |
| | | | 380/28 |
| 2017/0214532 A1 | 7/2017 | Das et al. | |
| 2017/0236570 A1* | 8/2017 | Kent | G11C 11/161 |
| | | | 365/158 |
| 2017/0272258 A1* | 9/2017 | Tanamoto | H04L 9/0866 |
| 2017/0365316 A1* | 12/2017 | Wang | G11C 11/1675 |

OTHER PUBLICATIONS

Holcomb, Daniel E. et al., "Power-up SRAM State as an Identifying Fingerprint and Source of True Random Numbers," IEEE Transactions on Computers, vol. 57, No. 11, Nov. 2008, 14 pages.
Integrated Circuit Engineering Corporation, "SRAM Technology," Section 8, available at least as early as Jun. 6, 2018, 24 pages, smithsonianchips.si.edu/ice/cd/MEMORY97/SEC08.PDF.
Vinella, Paolo, "A study of using STT-MRAM as Memory PUF: Design, Modeling and Quality Evaluation," Thesis, University of Illinois, 2015, 152 pages.

* cited by examiner $$A_{V\_DEG} = A_{VN} = \frac{V_{OUT}}{V_{IN}} = -\frac{g_{MN}R_{PFET}}{1+g_{MN}R_{ES\_DEG}} = \frac{A_V}{1+g_{MN}R_{ES\_DEG}} \approx -\frac{R_{PFET}}{R_{ES\_DEG}} \quad (6)$$

$$A_{V\_DEG} = \Delta A_{VN} = \frac{\Delta A_V}{1+g_{MN}R_{ES\_DEG}} - \frac{A_V}{(1+g_{MN}R_{ES\_DEG})^2}(\Delta g_{MN}R_{ES\_DEG} + g_{MN}\Delta R_{ES\_DEG}) \quad (7)$$

$$A_{V\_DEG} = \Delta A_{VN} \approx -\frac{\Delta R_{PFET}}{R_{ES\_DEG}} + \frac{R_{PFET}}{R_{ES\_DEG}^2}\Delta R_{ES\_DEG} \quad (8)$$

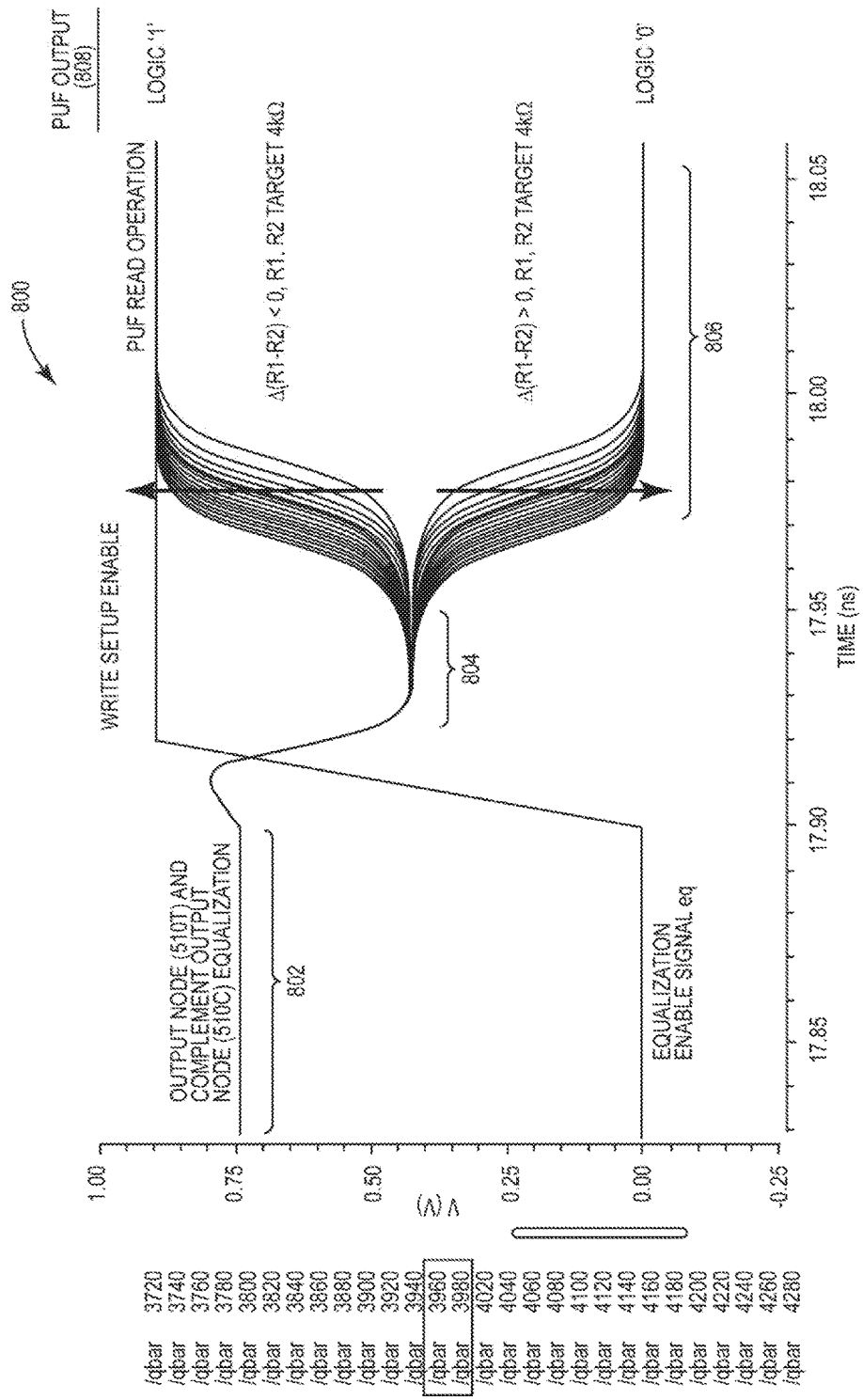

| RESISTANCE (1008) | PU CONDITION (1002) | PROBABILITY (1014) | PD CONDITION (1016) | PROBABILITY (1022) | PUF STATE | PROBABILITY (1024) |
|---|---|---|---|---|---|---|
| R1<R2 (PRE "1") 0.5 (1010) | PU1<PU2 (PRE "1") (1004) | 0.5X0.5=0.25 | PD1>PD2 (PRE "1") (1018) | 0.5X0.25=0.125 | 0 | 0.125X0=0 |
| | | | PD1<PD2 (PRE "0") (1020) | 0.5X0.25=0.125 | 1 | 0.125X1=0.125 |
| | PU1>PU2 (PRE "0") (1006) | 0.5X0.5=0.25 | PD1>PD2 (PRE "1") (1018) | 0.5X0.25=0.125 | 0 | 0.125X01/3=0.0417 |
| | | | | | 1 | 0.125X2/3=0.0833 |
| | | | PD1<PD2 (PRE "0") (1020) | 0.5X0.25=0.125 | 0 | 0.125X01/3=0.0417 |
| | | | | | 1 | 0.125X2/3=0.0833 |
| R1>R2 (PRE "0") 0.5 (1012) | PU1<PU2 (PRE "1") (1004) | 0.5X0.5=0.25 | PD1>PD2 (PRE "1") (1018) | 0.5X0.25=0.125 | 0 | 0.125X2/3=0.0833 |
| | | | | | 1 | 0.125X1/3=0.0417 |
| | | | PD1<PD2 (PRE "0") (1020) | 0.5X0.25=0.125 | 0 | 0.125X2/3=0.0833 |
| | | | | | 1 | 0.125X1/3=0.0417 |
| | PU1>PU2 (PRE "0") (1006) | 0.5X0.5=0.25 | PD1>PD2 (PRE "1") (1018) | 0.5X0.25=0.125 | 0 | 0.125X2/3=0.0833 |
| | | | | | 1 | 0.125X1/3=0.0417 |
| | | | PD1<PD2 (PRE "0") (1020) | 0.5X0.25=0.125 | 0 | 0.125X1=0.125 |
| | | | | | 1 | 0.125X0=0.125 |

$$P(0|R_1>R_2) = \frac{P(R_1>R_2|0) \cdot P(0)}{P(R_1>R_2)} = \frac{P(R_1>R_2|0) \cdot P(0)}{P(R_1>R_2|0) \cdot P(0) + P(R_1>R_2|1) \cdot P(1)}$$

$$P(0|R_1>R_2) = \frac{P(R_1>R_2|0) \cdot P(0)}{(P(R_1>R_2|0)-P(R_1>R_2|1)) \cdot P(0) + P(R_1>R_2|1)} = \frac{2P(0)}{P(0)+1}$$

$$P(0|PU_1>PU_2) = \frac{P(PU_1>PU_2|0) \cdot P(0)}{P(PU_1>PU_2)} = \frac{P(PU_1>PU_2|0) \cdot P(0)}{P(PU_1>PU_2|0) \cdot P(0) + P(PU_1>PU_2|1) \cdot P(1)}$$

$$P(0|PU_1>PU_2) = \frac{P(PU_1>PU_2|0) \cdot P(0)}{(P(PU_1>PU_2|0)-P(PU_1>PU_2|1)) \cdot P(0) + P(PU_1>PU_2|1)} = \frac{2P(0)}{P(0)+1}$$

$$P(0|PD_1<PD_2) = \frac{P(PD_1<PD_2|0) \cdot P(0)}{(P(PD_1<PD_2|0)-P(PD_1<PD_2|1)) \cdot P(0) + P(PD_1<PD_2|1)} = \frac{2P(0)}{P(0)+1}$$

$$P(0|R_1>R_2 \& PD_1<PD_2) = \frac{P(R_1>R_2 \& PD_1<PD_2|0) \cdot P(0)}{P(R_1>R_2 \& PD_1<PD_2)} = \frac{4.995 \cdot P(0)}{3.995 \cdot P(0)+1} \approx \frac{5 \cdot P(0)}{4 \cdot P(0)+1}$$

$$P(0|R_1>R_2 \& PU_1>PU_2) = \frac{P(R_1>R_2 \& PU_1>PU_2|0) \cdot P(0)}{P(R_1>R_2 \& PU_1>PU_2)} = \frac{5.024 \cdot P(0)}{4.024 \cdot P(0)+1} \approx \frac{5 \cdot P(0)}{4 \cdot P(0)+1}$$

$$P(0|R_1>R_2 \& PU_1>PU_2 \& PD_1>PD_2) = \frac{P(R_1>R_2 \& PU_1>PU_2 \& PD_1>PD_2|0) \cdot P(0)}{P(R_1>R_2 \& PU_1>PU_2 \& PD_1>PD_2)} = \frac{2P(0)}{P(0)+1}$$

$$P(0|R_1<R_2) = \frac{P(R_1<R_2|0) \cdot P(0)}{P(R_1<R_2)} = \frac{0.333P(0)}{-0.333P(0)+0.667} = \frac{P(0)}{-P(0)+2}$$

$$P(0|PU_1<PU_2) = \frac{P(PU_1<PU_2|0) \cdot P(0)}{(P(PU_1<PU_2|0)-P(PU_1<PU_2|1)) \cdot P(0) + P(PU_1<PU_2|1)} = \frac{P(0)}{-P(0)+2}$$

$$P(0|PD_1>PD_2) = \frac{P(PD_1>PD_2|0) \cdot P(0)}{(P(PD_1>PD_2|0)-P(PD_1>PD_2|1)) \cdot P(0) + P(PD_1>PD_2|1)} = \frac{P(0)}{-P(0)+2}$$

$$P(0|R_1<R_2 \& PD_1>PD_2) = \frac{P(R_1<R_2 \& PD_1>PD_2|0) \cdot P(0)}{P(R_1<R_2 \& PD_1>PD_2)} = \frac{0.0417P(0)}{-0.1666P(0)+0.2083} \approx \frac{P(0)}{-4P(0)+5}$$

$$P(0|R_1<R_2 \& PU_1<PU_2) = \frac{P(R_1<R_2 \& PU_1<PU_2|0) \cdot P(0)}{P(R_1<R_2 \& PU_1<PU_2)} = \frac{0.0417P(0)}{-0.1666P(0)+0.2083} \approx \frac{P(0)}{-4P(0)+5}$$

$$P(0|R_1<R_2 \& PU_1<PU_2 \& PD_1>PD_2) = \frac{P(R_1<R_2 \& PU_1<PU_2 \& PD_1>PD_2|0) \cdot P(0)}{P(R_1<R_2 \& PU_1<PU_2 \& PD_1>PD_2)} = \frac{0 \cdot P(0)}{-0.125 \cdot P(0)+0.125} = 0$$

*FIG. 11A*

$$P(1|R_1 > R_2) = \frac{P(R_1 > R_2|1) \cdot P(1)}{P(R_1 > R_2)} = \frac{P(R_1 > R_2|1) \cdot P(1)}{P(R_1 > R_2|1) \cdot P(1) + P(R_1 > R_2|0) \cdot P(0)}$$

$$P(1|R_1 > R_2) = \frac{P(R_1 > R_2|1) \cdot P(1)}{(P(R_1 > R_2|1) - P(R_1 > R_2|0)) \cdot P(1) + P(R_1 > R_2|0)} = \frac{P(1)}{-P(1)+2}$$

$$P(1|PU_1 > PU_2) = \frac{P(PU_1 > PU_2|1) \cdot P(1)}{P(PU_1 > PU_2)} = \frac{P(PU_1 > PU_2|1) \cdot P(1)}{P(PU_1 > PU_2|1) \cdot P(1) + P(PU_1 > PU_2|0) \cdot P(0)}$$

$$P(1|PU_1 > PU_2) = \frac{P(PU_1 > PU_2|1) \cdot P(1)}{(P(PU_1 > PU_2|1) - P(PU_1 > PU_2|0)) \cdot P(1) + P(PU_1 > PU_2|0)} \approx \frac{P(1)}{-P(1)+2}$$

$$P(1|PD_1 < PD_2) = \frac{P(PD_1 < PD_2|1) \cdot P(1)}{(P(PD_1 < PD_2|1) - P(PD_1 < PD_2|0)) \cdot P(1) + P(PD_1 < PD_2|0)} \approx \frac{P(1)}{-P(1)+2}$$

$$P(1|R_1 > R_2 \& PD_1 < PD_2) = \frac{P(R_1 > R_2 \& PD_1 < PD_2|1) \cdot P(1)}{P(R_1 > R_2 \& PD_1 < PD_2)} \approx \frac{P(1)}{-4P(1)+5}$$

$$P(1|R_1 > R_2 \& PU_1 > PU_2) = \frac{P(R_1 > R_2 \& PU_1 > PU_2|1) \cdot P(1)}{P(R_1 > R_2 \& PU_1 > PU_2)} \approx \frac{P(1)}{-4P(1)+5}$$

$$P(1|R_1 > R_2 \& PU_1 > PU_2 \& PD_1 > PD_2) = \frac{P(R_1 > R_2 \& PU_1 > PU_2 \& PD_1 > PD_2|1) \cdot P(1)}{P(R_1 > R_2 \& PU_1 > PU_2 \& PD_1 > PD_2)} = \frac{P(1)}{-P(1)+2}$$

$$P(1|R_1 < R_2) = \frac{P(R_1 < R_2|1) \cdot P(1)}{P(R_1 < R_2)} = \frac{0.667P(1)}{0.333P(1)+0.333} = \frac{2P(1)}{P(1)+1}$$

$$P(1|PU_1 < PU_2) = \frac{P(PU_1 < PU_2|1) \cdot P(1)}{(P(PU_1 < PU_2|1) - P(PU_1 < PU_2|0)) \cdot P(1) + P(PU_1 < PU_2|0)} = \frac{2P(1)}{P(1)+1}$$

$$P(1|PD_1 > PD_2) = \frac{P(PD_1 > PD_2|1) \cdot P(1)}{(P(PD_1 > PD_2|1) - P(PD_1 > PD_2|0)) \cdot P(1) + P(PD_1 > PD_2|0)} = \frac{2P(1)}{P(1)+1}$$

$$P(1|R_1 < R_2 \& PD_1 > PD_2) = \frac{P(R_1 < R_2 \& PD_1 > PD_2|1) \cdot P(1)}{P(R_1 < R_2 \& PD_1 > PD_2)} = \frac{5P(1)}{4P(1)+1}$$

$$P(1|R_1 < R_2 \& PU_1 < PU_2) = \frac{P(R_1 < R_2 \& PU_1 < PU_2|1) \cdot P(1)}{P(R_1 < R_2 \& PU_1 < PU_2)} = \frac{5P(1)}{4P(1)+1}$$

$$P(1|R_1 < R_2 \& PU_1 < PU_2 \& PD_1 > PD_2) = \frac{P(R_1 < R_2 \& PU_1 < PU_2 \& PD_1 > PD_2|1) \cdot P(1)}{P(R_1 < R_2 \& PU_1 < PU_2 \& PD_1 > PD_2)} = \frac{0.125 \cdot P(1)}{0.125 \cdot P(1)+0} = 1$$

*FIG. 11B*

PHYSICALLY UNCLONABLE FUNCTION (PUF) MEMORY EMPLOYING STATIC RANDOM ACCESS MEMORY (SRAM) BIT CELLS WITH ADDED PASSIVE RESISTANCE TO ENHANCE TRANSISTOR IMBALANCE FOR IMPROVED PUF OUTPUT REPRODUCIBILITY

BACKGROUND

I. Field of the Disclosure

The technology of the disclosure relates generally to physically unclonable function (PUF) circuits, and more particularly to a PUF memory employing a static random access memory (SRAM) array of memory bit cells for generating a PUF output in response to a challenge input.

II. Background

A physical unclonable function (PUF) (sometimes also called a physically unclonable function (PUF)) is a physical entity that is embodied in a physical structure, and is easy to evaluate but hard to predict. PUFs depend on the uniqueness of their physical microstructure. This microstructure depends on random physical factors introduced during manufacturing. For example, in the context of integrated circuits (ICs), an on-chip PUF is a chip-unique challenge-response mechanism exploiting manufacturing process variations within the ICs. These manufacturing process variations are unpredictable and uncontrollable, which makes it virtually impossible to duplicate or clone the PUF. Thus, when a stimulus is applied to a PUF cell, the PUF cell reacts and generates a response in an unpredictable but repeatable way due to the complex interaction of the stimulus with the physical microstructure of the IC employing the PUF cell. This exact microstructure of the IC depends on physical factors introduced during its manufacture, which are unpredictable. The applied stimulus is called the "challenge"; the reaction of the PUF is called the "response." A specific challenge and its corresponding response together form a challenge-response pair (CRP) or challenge-response behavior.

A PUF circuit's "unclonability" means that each IC employing the PUF circuit has a unique and unpredictable way of mapping challenges to responses, even if one IC is manufactured with the same process as another, seemingly identical IC. PUF circuits depend on the uniqueness of their physical microstructure. Thus, because it is practically infeasible to construct a PUF circuit with the same challenge-response behavior as another PUF circuit, a PUF circuit can be included in an IC to generate unique, random information based on the underlying physical characteristics of the microstructure of a device. This microstructure depends on random physical factors introduced during manufacturing. For example, in the context of ICs, an on-chip PUF is a chip-unique challenge-response mechanism exploiting manufacturing process variations within the ICs.

PUF circuits can be implemented in different technologies. As an example, a PUF cell in a PUF circuit can be provided in the form of a static random access memory (SRAM) cell. For example, FIG. 1 illustrates a PUF cell 100 in the form of an SRAM bit cell 102 that can be provided in a PUF circuit. As shown therein, the SRAM bit cell 102 is comprised of two cross-coupled inverters 104(1), 104(2). Each inverter 104(1), 104(2) includes a respective pull-up P-type Field-Effect Transistor (FET) (PFET) 106P(1), 106P(2) coupled to a positive voltage rail 108P having a positive supply voltage $V_{DD}$, and a respective pull-down N-type FET (NFET) 106N(1), 106N(2) coupled to a negative voltage rail 108N having a ground voltage or negative supply voltage $V_{SS}$. The cross-coupled inverters 104(1), 104(2) reinforce each other to retain data in the form of a voltage on a respective true storage output T and a complement storage output C. In a read operation, a bit line BL and a complement bit line BLB are pre-charged to the positive supply voltage $V_{DD}$, or half of the positive supply voltage $V_{DD}$ as examples. Then, a word line WL coupled to gates G of access transistors 110(1), 110(2) is asserted to evaluate differential voltages on the true storage output T and complement storage output C to read the SRAM bit cell 102. If the SRAM bit cell 102 has not been previously written, the initial state of the SRAM bit cell 102 is determined by process variation of the pull-up PFETs 106P(1), 106P(2) and the pull-down NFETs 106N(1), 106N(2) when the word line WL is asserted to activate the access transistors 110(1), 110(2) (their gate-to-source voltage exceeding their threshold voltage $V_{TH}$). Thus, the SRAM bit cell 102 can be used to generate a random PUF output. Either the true storage output T or complement storage output C can be used as the random PUF output. The voltage state ($V_{DD}$ or $V_{SS}$) on the true storage output T will eventually settle to be the opposite voltage state ($V_{SS}$ or $V_{DD}$) on the complement storage output C.

Ideally, the inverters 104(1), 104(2) will be symmetrically matched so that the SRAM bit cell 102 is not skewed to favor settling to one voltage state over the other. For example, the lengths L and threshold voltages $V_{TH}$ of complementary pull-up PFETs 106P(1), 106P(2) and complementary pull-down NFETs 106N(1), 106N(2) can be sized to generate a same voltage noise $V_{NOISE}$. As shown in FIG. 2A, ideally, the SRAM bit cell 102 in FIG. 1 has a neutral skew, wherein the inverters 104(1), 104(2) are symmetrically matched to generate a PUF output that is logic '0' for approximately half of PUF read operations and logic '1' for approximately the other half of the PUF read operations. However, process variations can cause the complementary pull-up PFETs 106P(1), 106P(2) and complementary pull-down NFETs 106N(1), 106N(2) in the inverters 104(1), 104(2) in the SRAM bit cell 102 in FIG. 1 to be mismatched, and thus be skewed towards one voltage state. This is shown by example in FIG. 2B. As shown in FIG. 2B, random noise $\delta_{NOISE}$ resulting from process variation $\Delta_{PV}$ skews the voltage state (i.e., neutral-skewed) of the SRAM bit cell 102 to always generate a logic '1' PUF output.

FIG. 3 illustrates the inverter 104(2) of the SRAM bit cell 102 in FIG. 1 modeled in an equivalent common source amplifier circuit 300 (hereinafter "equivalent circuit 300"). In the equivalent circuit 300, when an input voltage $V_{IN}$ turns on the pull-down NFET 106N(2), the pull-down NFET 106N(2) acts as an amplifying transistor with resistance $R_{ON}$, and the pull-up PFET 106P(2) acts as a load resistor with series load resistance $R_{PFET}$. The series load resistance $R_{PFET}$ is a variable resistance influenced by the input voltage $V_{IN}$. A voltage gain $A_{V\_CFET}$ of the inverter 104(2), which is output voltage $V_{OUT}$ divided by the input voltage $V_{IN}$ ($V_{OUT}/V_{IN}$), can be approximated by equations 302 shown in FIG. 3. As shown in equation (1) in FIG. 3, when the pull-down NFET 106N(2) is turned on, voltage gain $V_{V\_CMOS}$ is the current gain $g_{MN}$ (i.e., change in drain current $I_D$ for a given change in input voltage $V_{IN}$) of the pull-down NFET 106N(2) multiplied by the parallel resistances $R_{ON}$ and $R_{PFET}$. The resistance $R_{ON}$ will be negligible as compared to the series load resistance $R_{PFET}$ when the pull-down NFET 106N(2) is on. Thus, the voltage gain $V_{V\_CMOS}$ of the pull-down NFET 106N(2) will be approximately the current gain $g_{MN}$ of the pull-down NFET 106N(2) multiplied by the series load resistance $R_{PFET}$. Variations in the input voltage $V_N$ applied to a gate G of the pull-down NFET 106N(2) multiplied by its current gain $g_{MN}$ controls a drain current $I_D$ variation. Thus, the variation in drain current $I_D$ multiplied by the resistance $R_{ON}$ of the pull-down NFET 106N(2) controls output voltage variation $\Delta V_{OUT}$. Therefore, a small-signal gain $A_{V\_CFET} = g_{MN} * R_{ON}$ of the inverter 104(2) is expected.

Thus, when the pull-down NFET 106N(2) is turned on, as shown in equation (2) in FIG. 3, output voltage variation $\Delta V_{OUT}$ between the pull-up PFET 106P(2) and its complementary pull-up PFET 106P(1) in FIG. 1 is $\Delta \Delta_{V\_CMOS}$ representing the process variation in the pull-up PFETs 106P(1), 106P(2) between two inverters 104(1), 104(2) in FIG. 1. Similarly, when the pull-up PFET 106P(2) is turned on, as shown in equation (3) in FIG. 3, the output voltage variation $\Delta V_{OUT}$ between the pull-down NFET 106N(2) and its complementary pull-down NFET 106N(1) in FIG. 1 is A $A_{V\_CMOS}$ representing the process variation in the pull-down NFETs 106N(1), 106N(2). So, the imbalance of the two inverters 104(1), 104(2) in the SRAM bit cell 102 in FIG. 1 is a function of the resistance mismatch between a same type, complementary transistors in the inverters 104(1), 104(2). As discussed above, ideally, the inverters 104(1), 104(2) in the SRAM bit cell 102 will be symmetrically matched so that the SRAM bit cell 102 is not skewed to favor settling to one voltage state over the other. However, process variations can cause the complementary pull-up PFETs 106P(1), 106P(2) and complementary pull-down NFETs 106N(1), 106N(2) in the inverters 104(1), 104(2) in the SRAM bit cell 102 in FIG. 1 to be mismatched, and thus be skewed towards one voltage state.

Thus, the SRAM bit cell 102 in FIG. 1 can be used to provide PUF memory cells in a PUF circuit by taking advantage of this imbalance in the inverters 104(1), 104(2) that will occur through process variation as shown and discussed with regard to FIG. 3. A plurality of the SRAM bit cells 102 can be used to generate random X-bit numbers at power-up through a read operation, such as chip identifications for example. The SRAM bit cells 102 would be read from and not written to first to obtain a random state at power-up. However, the reproducibility of the SRAM bit cell 102 in FIG. 1 may be so inconsistent that a huge redundant array and sophisticated error correction scheme may be required to implement a PUF memory with the SRAM bit cells 102. The SRAM bit cell 102 also can suffer from high error rates between cycles, temperature, and supply power.

Thus, the SRAM bit cell 102 in FIG. 1 used in a PUF memory should ideally provide reproducible outputs even under hostile conditions such as high temperature. SRAM bit cells like the SRAM bit cell 102 in FIG. 1 are classified depending upon the sensitivity to stress conditions. A non-skewed SRAM bit cell is an SRAM bit cell that has measurable mismatch between its two inverters. This does not mean process variations are not present in the SRAM bit cell, but that the combined effects of any process variations offset each other. A non-skewed SRAM bit cell randomly generates either a '0' or '1' as an output depending mainly upon noise present in the system. A skewed SRAM bit cell is an SRAM bit cell with some mismatch between its two inverters that do not offset each other. In this manner, skewed SRAM bit cells have a preferred state depending upon the nature of the mismatch. A skewed SRAM bit cell can flip and produce a different, inconsistently reproducible output due to variation of external conditions, such as temperature and noise. A fully skewed SRAM bit cell is an SRAM bit cell that has a high mismatch between its two inverters in such a way that the SRAM bit cell always takes its preferred initial state regardless of the stress conditions. Ideally, SRAM bit cells used in a PUF memory, like the SRAM bit cell 102 in FIG. 1, should produce a consistently reproducible output even with variations in external conditions such as temperature and noise. However, it typically cannot be guaranteed that the SRAM bit cell 102 will be fully skewed, which will introduce some amount of inconsistency in the PUF circuit generating a reproducible output in an undesirable manner.

SUMMARY OF THE DISCLOSURE

Aspects disclosed herein include physically unclonable function (PUF) memory employing static random access memory (SRAM) bit cells with added passive resistance. A passive resistance is provided by a passive component (e.g., a resistor, a magnetic tunnel junction (MTJ), a resistive rRAM resistance, etc.) that does not require electrical power to provide resistance. Added passive resistance can enhance imbalance between transistors of an SRAM bit cell for improved PUF output reproducibility. Enhancing the imbalance between transistors in the SRAM bit cell can more fully skew the SRAM bit cell for increased PUF output reproducibility while still achieving the benefits of output randomness. In one exemplary aspect disclosed herein, the passive resistances added in the SRAM bit cell are coupled to a drain of one or more pull-down N-type Field-Effect Transistors (FETs) (NFETs) in one or more cross-coupled inverters in the SRAM bit cell to enhance the gain imbalance between the inverters. Enhanced gain imbalance between the transistors in the SRAM bit cell increases sensitivity in output voltage of the SRAM bit cell for a given change in input voltage resulting in greater skew of the SRAM bit cell for increased reproducibility. In another example, the added passive resistance is not coupled to sources of the NFETs in the SRAM bit cell, because such may enhance source degeneration of the NFETs that would cause the output voltage of the SRAM bit cell to be more linear for a given change in input voltage, and thus less sensitive to change in the input voltage over time for multiple read operations.

In this regard, in one exemplary aspect, an SRAM bit cell is provided. The SRAM bit cell comprises a storage circuit comprising an input node, an output node, and a pull-down circuit coupled to the input node, the output node, and a voltage rail (e.g., a ground rail or negative voltage rail). The SRAM bit cell also comprises a complement storage circuit comprising a complement input node coupled to the output node of the storage circuit, a complement output node coupled to the input node of the storage circuit, and a complement pull-down circuit coupled to the complement input node, the complement output node, and the voltage rail. The SRAM bit cell also comprises a passive resistance circuit having a resistance, wherein the passive resistance circuit is coupled to the pull-down circuit. The SRAM bit cell also comprises a complement passive resistance circuit having a complement resistance, and is coupled to the complement pull-down circuit.

In another exemplary aspect, a method of generating a PUF output from a PUF memory array comprising a plurality of memory bit cell row circuits each comprising a plurality of SRAM bit cells, and a plurality of memory bit cell column circuits each comprising an SRAM bit cell from a memory bit cell row circuit among the plurality of memory bit cell row circuits, is provided. The method comprises selecting at least one SRAM bit cell in a memory bit cell row circuit among the plurality of memory bit cell row circuits to be read based on a memory read address in response to a PUF read operation. The plurality of SRAM bit cells each comprise a storage circuit comprising an input node, an output node, and a pull-down circuit coupled to the input node, the output node, and a voltage rail. Each SRAM bit cell also comprises a complement storage circuit comprising a complement input node coupled to the output node of the storage circuit, a complement output node coupled to the input node of the storage circuit, and a complement pull-down circuit coupled to the complement input node, the complement output node, and the voltage rail. Each SRAM bit cell also comprises a passive resistance circuit having a resistance, wherein the passive resistance circuit is coupled to the pull-down circuit. Each SRAM bit cell also comprises a complement passive resistance circuit having a complement resistance, which is coupled to the complement pull-down circuit. The method also comprises generating a data output indicating a memory state from the selected at least one SRAM bit cell in response to the PUF read operation.

In another exemplary aspect, a PUF memory is provided. The PUF memory comprises a PUF memory array. The PUF memory array comprises a plurality of PUF bit cell row circuits each comprising a plurality of SRAM bit cells. Each SRAM bit cell among the plurality of SRAM bit cells comprises a storage circuit comprising an input node, an output node, and a pull-down circuit coupled to the input node, the output node, and a voltage rail. Each SRAM bit cell also comprises a complement storage circuit comprising a complement input node coupled to the output node of the storage circuit, a complement output node coupled to the input node of the storage circuit, and a complement pull-down circuit coupled to the complement input node, the complement output node, and the voltage rail. Each SRAM bit cell also comprises a passive resistance circuit having a resistance, wherein the passive resistance circuit is coupled to the pull-down circuit. Each SRAM bit cell also comprises a complement passive resistance circuit having a complement resistance, wherein the complement passive resistance circuit is coupled to the complement pull-down circuit. The PUF memory also comprises a plurality of PUF bit cell column circuits each comprising an SRAM bit cell among the plurality of SRAM bit cells from a memory bit cell row circuit among the plurality of memory bit cell row circuits. The PUF memory also comprises a PUF output coupled to the PUF memory array. The PUF memory is configured to generate a data output on the PUF output based on a memory state in at least one SRAM bit cell among the plurality of SRAM bit cells accessed in a PUF read operation to the PUF memory array.

BRIEF DESCRIPTION OF THE FIGURES

FIGS. 8A-8C are graphs illustrating exemplary Monte-Carlo simulated PUF outputs from an output node of the SRAM bit cell in FIG. 5 based on a mismatch between added passive resistance;

FIG. 10A is a table illustrating an exemplary likelihood probability analysis of a logic state stored in the SRAM bit cell in FIG. 5 based on different strength comparisons between pull-up PFETs and pull-down NFETs in cross-coupled inverters in the SRAM bit cell;

FIG. 10B illustrates exemplary Bayesian probability calculations of the natural logic state skew of the SRAM bit cell in FIG. 5 based on the likelihood probability analysis in FIG. 10A and a read logic state stored in the SRAM bit cell in FIG. 5;

FIG. 11A illustrates formulas for the Bayesian probability calculations in FIG. 10B for a natural logic state skew of '0' in the SRAM bit cell in FIG. 5;

FIG. 11B illustrates formulas for the Bayesian probability calculations in FIG. 10B for a natural logic state skew of '1' in the SRAM bit cell in FIG. 5;

DETAILED DESCRIPTION

Figure 1:
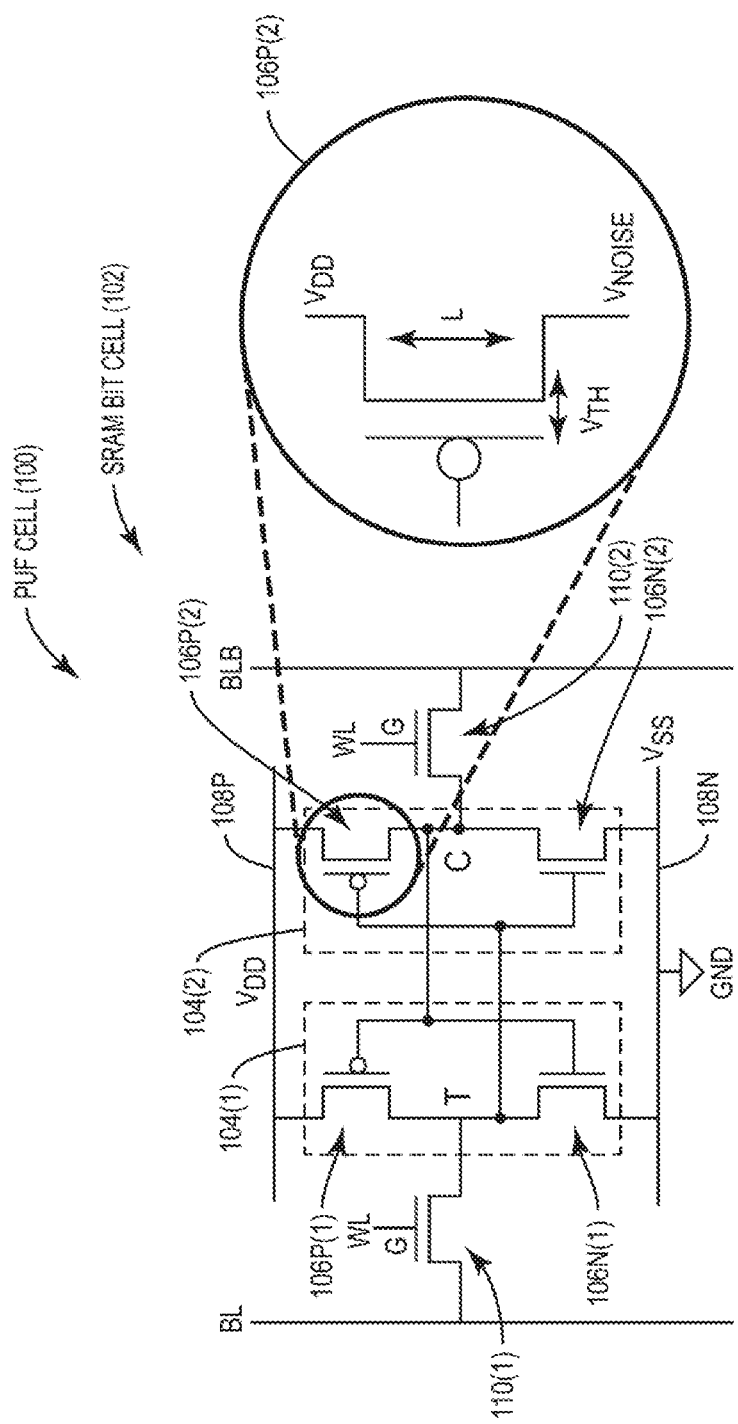
FIG. 1 is a schematic diagram of an exemplary static random access memory (SRAM) bit cell that can be used as a PUF cell in a PUF circuit.
Figure 2A:
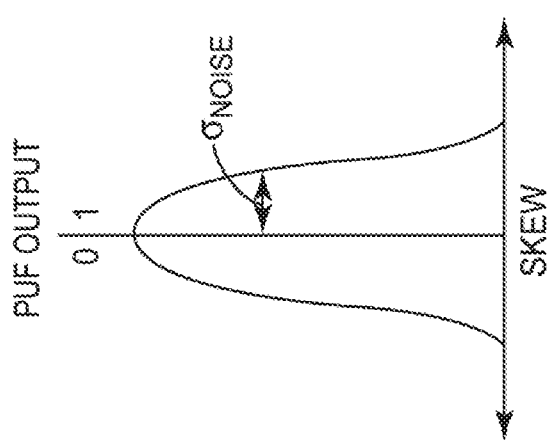
FIGS. 2A and 2B are graphs illustrating neutral skew and a logic '1' memory state skew, respectively, in an SRAM bit cell.
Figure 2B:
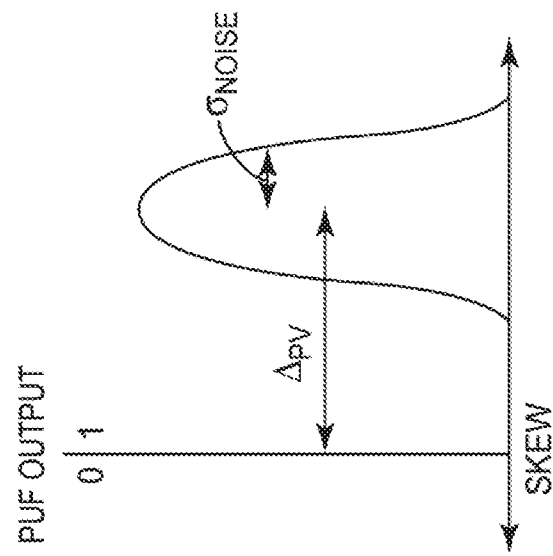
Figure 3:
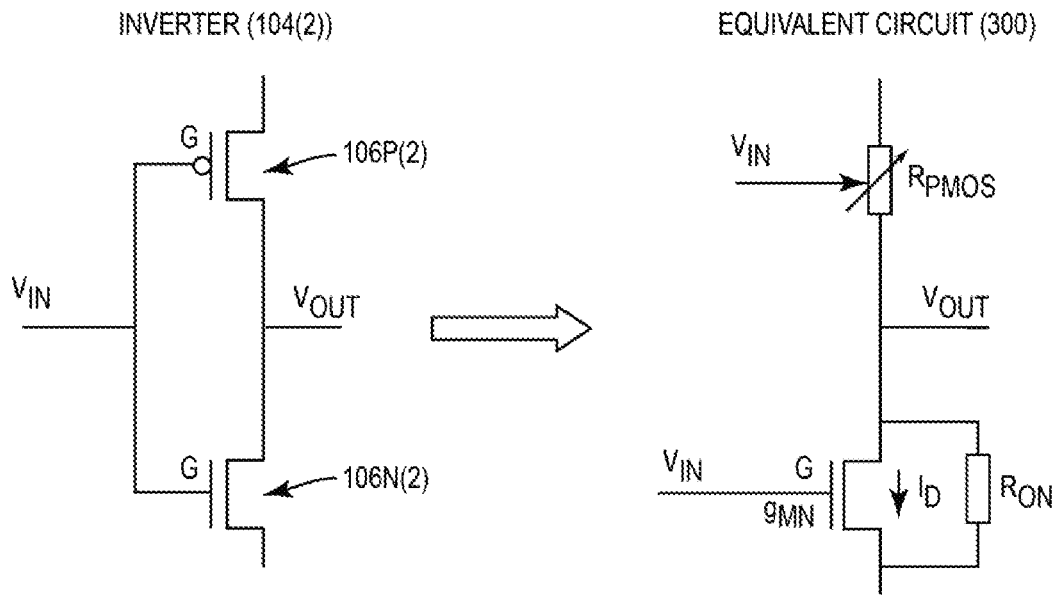
FIG. 3 is schematic diagram illustrating an inverter circuit in the SRAM bit cell in FIG. 1 and details how the inverter circuit can be modeled with an N-type Field-Effect Transistor (FET) (NFET) as an amplifying transistor having an on resistance and a P-type FET (PFET) as a load resistor to illustrate voltage gain of the inverter circuit as a function of gate voltage variation.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include physically unclonable function (PUF) memory employing static random access memory (SRAM) bit cells with added passive resistance. A passive resistance is provided by a passive component (e.g., a resistor, a magnetic tunnel junction (MTJ), a resistive RRAM resistance, etc.) that does not require electrical power to provide resistance. Added passive resistance can enhance imbalance between transistors of an SRAM bit cell for improved PUF output reproducibility. Enhancing the imbalance between transistors in the SRAM bit cell can more fully skew the SRAM bit cell for increased PUF output reproducibility while still achieving the benefits of output randomness. In one exemplary aspect disclosed herein, the passive resistances added in the SRAM bit cell are coupled to a drain of one or more pull-down N-type Field-Effect Transistors (FETs) (NFETs) in one or more cross-coupled inverters in the SRAM bit cell to enhance the gain imbalance between the inverters. Enhanced gain imbalance between the transistors in the SRAM bit cell increases sensitivity in output voltage of the SRAM bit cell for a given change in input voltage resulting in greater skew of the SRAM bit cell for increased reproducibility. In another example, the added passive resistance is not coupled to sources of the NFETs in the SRAM bit cell, because such may enhance source degeneration of the NFETs that would cause the output voltage of the SRAM bit cell to be more linear for a given change in input voltage, and thus less sensitive to change in the input voltage over time for multiple read operations.

Figure 4:
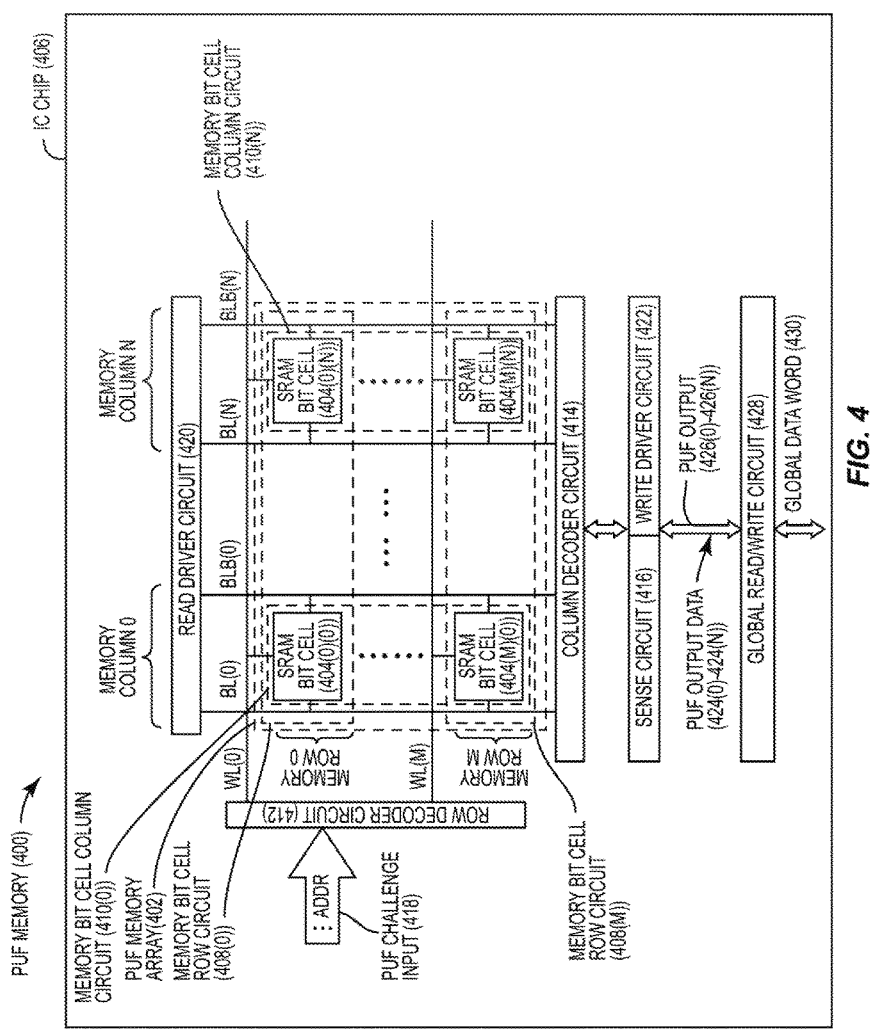
FIG. 4 is a schematic diagram of an exemplary PUF circuit in the form of a PUF memory that includes a PUF memory array comprising a plurality of SRAM bit cells addressable by rows and columns, and supporting access circuitry, with passive resistance added in the SRAM bit cells to enhance imbalance between transistors of the SRAM bit cells for improved PUF output reproducibility.

In this regard, FIG. 4 is a block diagram of an exemplary PUF memory 400 that includes a PUF memory array 402. As will be discussed in more detail below, the PUF memory array 402 in this example includes a plurality of SRAM bit cells 404(0)(0)-404(M)(N) with added passive resistance to enhance their imbalance for improved PUF output reproducibility in PUF operations. A passive resistance is provided by a passive component (e.g., a resistor, an MTJ, an RRAM resistance, etc.) that does not require electrical power to provide resistance. The PUF memory 400 may be provided on a separate IC chip 406 from a processor or integrated into a same IC chip as a processor. In this example, the PUF memory array 402 includes the plurality of SRAM bit cells 404(0)(0)-404(M)(N) organized into 'M+1' memory rows 0-M and 'N+1' memory columns 0-N. Each SRAM bit cell 404(0)(0)-404(M)(N) is configured to generate an output with logic states representing stored memory states. The PUF memory array 402 includes a plurality of memory bit cell row circuits 408(0)-408(M) each provided in a respective memory row 0-M. Each memory bit cell row circuit 408(0)-408(M) includes a plurality of SRAM bit cells 4040(0)-4040(N) each provided in a respective memory column 0-N for generating a PUF output. The SRAM bit cells 404(0)(0)-404(M)(N) are also organized in their respective memory columns 0-N to form respective memory bit cell column circuits 410(0)-410(N). Each memory bit cell column circuit 410(0)-410(N) includes a plurality of SRAM bit cells 404(0)0-404(M)( ) each provided in a respective memory row 0-M.

With continuing reference to FIG. 4, the PUF memory 400 includes a row decoder circuit 412, a challenge column decoder circuit 414, and a sense circuit 416. The row decoder circuit 412 is coupled to the PUF memory array 402 via word lines WL(0)-WL(M). Word lines WL(0)-WL(M) are coupled to the SRAM bit cells 404(0)(0)-404(M)(N) in the respective memory bit cell row circuits 408(0)-408(M). The row decoder circuit 412 is configured to assert one or more word lines WL(0)-WL(M) in response to a particular memory address ADDR on a PUF challenge input 418 received by the PUF memory 400 to initiate a PUF access (e.g., read) operation to the PUF memory array 402. The challenge column decoder circuit 414 is coupled to the PUF memory array 402 via bit lines BL(0)-BL(N) and complement bit lines BLB(0)-BLB(N). A read driver circuit 420 is provided and coupled to the memory bit cell column circuits 410(0)-410(N) to pre-charge the bit lines BL(0)-BL(N) and complement bit lines BLB(0)-BLB(N) with voltages to setup a read operation to the SRAM bit cells 404(0)(0)-404(M)(N) in a selected memory bit cell row circuit 408(0)-408(M). A write driver circuit 422 is coupled to the memory bit cell column circuits 410(0)-410(N) to generate a write voltage on the bit lines BL(0)-BL(N) and complement bit lines BLB(0)-BLB(N) to write data from an SRAM bit cell 404(0)(0)-404(M)(N) in a selected memory bit cell row circuit 408(0)-408(M).

With continuing reference to FIG. 4, the sense circuit 416 may be coupled to the PUF memory array 402 via the bit lines BL(0)-BL(N) and the complement bit lines BLB(0)-BLB(N). The sense circuit 416 may be configured to generate a PUF output data 424(0)-424(N) on a PUF output 426(0)-426(N) of 'N+1' bits. The logic states of the PUF output data 424(0)-424(N) on the PUF output 426(0)-426(N) is based on the sensed voltages on the bit lines BL(0)-BL(N) and the complement bit lines BLB(0)-BLB(N) in response to a PUF read operation. The voltages of the bit lines BL(0)-BL(N) and the complement bit lines BLB(0)-BLB(N) during a read phase are indicative of the memory state of the SRAM bit cells 404(0)(0)-404(M)(N) coupled to the bit lines BL(0)-BL(N) and the complement bit lines BLB(0)-BLB(N). For example, in response to a PUF read operation, the read driver circuit 420 asserts and de-asserts control signals to cause the SRAM bit cells 404(0)(0)-404(M)(N) in the selected memory bit cell row circuit 408(0)-408(M) according to the activated word line WL(0)-WL(M) generated by the row decoder circuit 412 to generate the PUF output data 424(0)-424(N) on the PUF output 426(0)-426(N). To illustrate, PUF output data 424(0)-424(N) (e.g., a "response") may be generated by the PUF memory array 402 in response to a particular memory address ADDR (e.g., a "challenge"). In this manner, the PUF memory array 402 may output different PUF output data 424(0)-424(N) (e.g., different "responses") based on different addresses (e.g., different "challenges"). The PUF output data 424(0)-424(N) can be provided to a global read/write circuit 428 to provide a global data word 430 in a processor.

Thus, as shown in FIG. 4, the PUF output data 424(0)-424(N) is generated on the PUF output 426(0)-426(N) by the PUF memory array 402. The PUF output 426(0)-426(N) is based on the logic values corresponding directly to stored memory states in the SRAM bit cells 404(0)(0)-404(M)(N) in the selected memory bit cell row circuit 408(0)-408(M) addressed by the memory address ADDR as the PUF challenge input 418. In this example, the PUF memory array 402 is configured to repeatedly generate the same PUF output data 424(0)-424(N) in response to the same memory address ADDR on the PUF challenge input 418.

Figure 5:
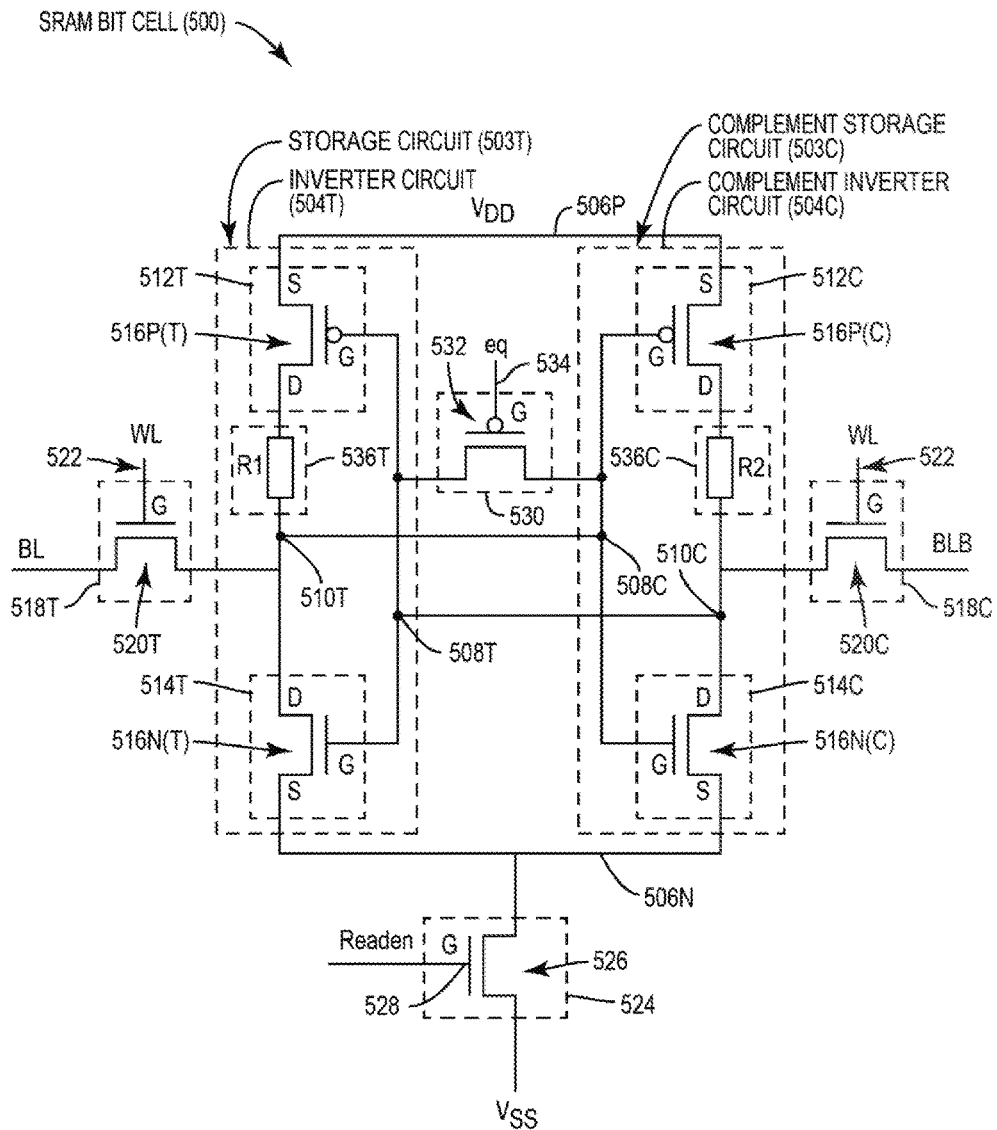
FIG. 5 is an exemplary SRAM bit cell that can be employed as the SRAM bit cells in the PUF memory array of the PUF memory in FIG. 4, wherein passive resistance in the form of resistors is added and coupled to drains of respective pull-up PFETs and pull-down NFETs of cross-coupled inverter circuits to enhance imbalance between transistors in the inverter circuits.

FIG. 5 illustrates an exemplary SRAM bit cell 500 that can be employed as the SRAM bit cells 404(0)(0)-404(M)(N) in the PUF memory array 402 of the PUF memory 400 in FIG. 4. As shown therein and discussed in more detail below, passive resistances in the form of resistors R1, R2 are added to the SRAM bit cell 500 to enhance imbalance between transistors in an inverter circuit 504T and a complement inverter circuit 504C provided therein. In this example, the SRAM bit cell 500 is a 6-transistor (T) (6-T) static complement memory bit cell. The SRAM bit cell 500 includes a storage circuit 503T and a complement storage circuit 503C. The complement storage circuit 503C is configured to store a logic value in the form of a charge voltage that is the complement of the logic value in the form of a charge voltage stored in the storage circuit 503T. In this example, the storage circuit 503T and complement storage circuit 503C are respective, cross-coupled inverter and complement inverter circuits 504T, 504C powered by a positive supply voltage $V_{DD}$ on a positive supply voltage rail 506P. The inverter and complement inverter circuits 504T, 504C each include respective input and complement input nodes 508T, 508C, and respective output and complement output nodes 510T, 510C. The inverter and complement inverter circuits 504T, 504C are each configured to generate a signal representing data on its respective output and complement output nodes 510T, 510C that is an inverted logic state of a signal representing data on its respective input and complement input nodes 508T, 508C. The inverter and complement inverter circuits 504T, 504C reinforce each other to retain data in the form of a voltage on a respective output node 510T and a complement output node 510C by their respective output and complement output nodes 510T, 510C being coupled to the respective complement input and input nodes 508C, 508T. The inverter and complement inverter circuits 504T, 504C in this example are each comprised of a respective pull-up circuit 512T and complement pull-up circuit 512C coupled to a respective pull-down circuit 514T and complement pull-down circuit 514C. In this example, the pull-up and complement pull-up circuits 512T, 512C are respective pull-up PFET and complement pull-up PFET 516P(T), 516P(C), and the pull-down and complement pull-down circuits 514T, 514C are a respective pull-down NFET and complement pull-down NFET 516N(T), 516N(C). The pull-up PFET and complement pull-up PFET 516P(T), 516P(C) are both coupled to the positive supply voltage rail 506P configured to receive the positive supply voltage $V_{DD}$. The pull-down NFET and complement pull-down NFET 516N(T), 516N(C) are coupled to a voltage rail 506N, which may be a ground node or a negative supply voltage for example. An access circuit 518T and complement NFET access circuit 518C in the form of NFET access and complement NFET access transistors 520T, 520C are coupled to the respective inverter and complement inverter circuits 504T, 504C to provide read and write access to the SRAM bit cell 500. The NFET access and complement NFET access transistors 520T, 520C are coupled to a respective bit line BL and complement bit line BLB, which may be a bit line BL and a complement bit line BLB in the PUF memory array 402 corresponding to one of the memory bit cell column circuits 410(0)-410(N) in FIG. 4.

With continuing reference to FIG. 5, in a read operation to the SRAM bit cell 500, the bit lines BL and complement bit lines BLB are pre-charged to a same value, which in this example is a half voltage based on the positive supply voltage $V_{DD}$. Then, a word line signal 522 of a word line enable state (e.g., a higher voltage value) is asserted on a word line WL coupled to gates G of the NFET access and complement NFET access transistors 520T, 520C to evaluate the differential voltages on the output node 510T and complement output node 510C to read the SRAM bit cell 500.

Activation of the NFET access and complement NFET access transistors 520T, 520C will couple the respective bit line BL and complement bit line BLB to the output node 510T and complement output node 510C. Deactivation of the NFET access and complement NFET access transistors 520T, 520C will decouple the respective bit line BL and complement bit line BLB from the output node 510T and complement output node 510C. If a logic high voltage level (i.e., a '1') is stored at the output node 510T, a logic low voltage level (i.e., '0') is stored at the complement output node 510C. If a logic low voltage level (i.e., a '0') is stored at the output node 510T, a logic high voltage level (i.e., '1') is stored at the complement output node 510C. Activation of the word line WL will cause the NFET access and complement NFET access transistors 520T, 520C to discharge the pre-charged voltage on the respective bit line BL or complement bit line BLB to the respective output or complement output nodes 510T, 510C and through the respective NFET access and complement NFET access transistors 520T, 520C to the voltage rail 506N.

With continuing reference to FIG. 5, in a write operation to the SRAM bit cell 500, the bit lines BL and complement bit lines BLB are charged with write data to be written to the output or complement output nodes 510T, 510C. The write data charged on bit lines BL and complement bit lines BLB has complementary logic values unlike when a read operation is performed. Then, the word line signal 522 of a word line enable state (e.g., a higher voltage value) is asserted on the word line WL coupled to the gates G of the NFET access and complement NFET access transistors 520T, 520C. If a logic high voltage level (i.e., a '1') is stored at the output node 510T, a logic low voltage level (i.e., '0') is stored at the complement output node 510C. If a logic low voltage level (i.e., a '0') is stored at the output node 510T, a logic high voltage level (i.e., '1') is stored at the complement output node 510C. Activation of the word line WL will cause the write data on the bit line BL and complement bit line BLB to pass through the NFET access and complement NFET access transistors 520T, 520C to the output or complement output nodes 510T, 510C.

With continuing reference to FIG. 5, the SRAM bit cell 500 also includes a read enable control circuit 524 in the form of an NFET 526 in this example. The NFET 526 is coupled between sources S of the pull-down and complement pull-down NFETs 516N(T), 516N(C) and the voltage rail 506N to control when the SRAM bit cell 500 is activated. A gate G of the NFET 526 is configured to receive a read enable signal Readen on a read enable input 528. Also as shown in FIG. 5, the SRAM bit cell 500 further includes an equalization circuit 530, which is a PFET 532 in this example. The equalization circuit 530 includes an equalization input 534, which is coupled to a gate G of the PFET 532. The equalization circuit 530 is coupled to the input node 508T and the complement input node 508C. The equalization circuit 530 is configured to couple the input node 508T to the complement input node 508C in response to an equalization enable signal eq on the equalization input 534 indicating an equalization enable state, and decouple the input node 508T from the complement input node 508C in response to the equalization enable signal eq on the equalization input 534 indicating an equalization disable state. The equalization circuit 530 can be activated to couple the input node 508T to the complement input node 508C in response to a PUF read operation so that the respective complement output node 510C and output node 510T are forced to start at the same data value before a read operation occurs. The natural random process mismatching causing a logic state skew in the SRAM bit cell 500 will control the ultimate data values on the output node 510T and complement output node 510C.

With continuing reference to FIG. 5, the imbalance of the inverter and complement inverter circuits 504T, 504C in the SRAM bit cell 500 is a function of the resistance mismatch between the same type, complementary transistors in the inverter and complement inverter circuits 504T, 504C. Ideally, the inverter and complement inverter circuits 504T, 504C in the SRAM bit cell 500 will be symmetrically matched so that the SRAM bit cell 500 is not skewed to favor settling to one voltage state over the other. However, process variations can cause the pull-up and complementary pull-up PFETs 516P(T), 516P(C) and pull-down and complementary pull-down NFETs 516N(T), 516N(C) in the inverter and complement inverter circuits 504T, 504C in the SRAM bit cell 500 to be mismatched, and thus be skewed towards one voltage state. Thus, the SRAM bit cell 500 can be used to provide memory cells in the PUF memory 400 in FIG. 4 by taking advantage of this imbalance in the inverter and complement inverter circuits 504T, 504C that will occur through process variation. However, imbalance may not be large enough such that that reproducibility of the SRAM bit cell 500 is consistent. The SRAM bit cell 500 should ideally provide reproducible outputs even under hostile conditions, such as high temperature.

In this regard, to enhance the imbalance between the inverter and complement inverter circuits 504T, 504C in the SRAM bit cell 500 in FIG. 5, passive and complement passive resistance circuits 536T, 536C are added. In this example, the passive and complement passive resistance circuits 536T, 536C are added in the form of resistors R1, R2 each having a respective resistance, as shown in FIG. 5. In this example, the passive resistance circuit 536T is coupled to the pull-up circuit 512T and the pull-down circuit 514T. The complement passive resistance circuit 536C is coupled to the complement pull-up circuit 512C and the complement pull-down circuit 514C. More specifically, in this example, the passive resistance circuit 536T is coupled between the drain D of the pull-up PFET 516P(T) and the output node 510T of the inverter circuit 504T, wherein the output node 510T is also coupled to the drain D of the pull-down NFET 516N(T). Similarly, in this example, the complement passive resistance circuit 536C is coupled between the drain D of the complement pull-up PFET 516P(C) and the complement output node 510C of the complement inverter circuit 504C, wherein the complement output node 510C is also coupled to the source S of the complement pull-down NFET 516N(C). The effect of this added passive resistance to enhance the imbalance of the SRAM bit cell 500 is discussed in regard to FIG. 6, which is now discussed.

Figure 6:
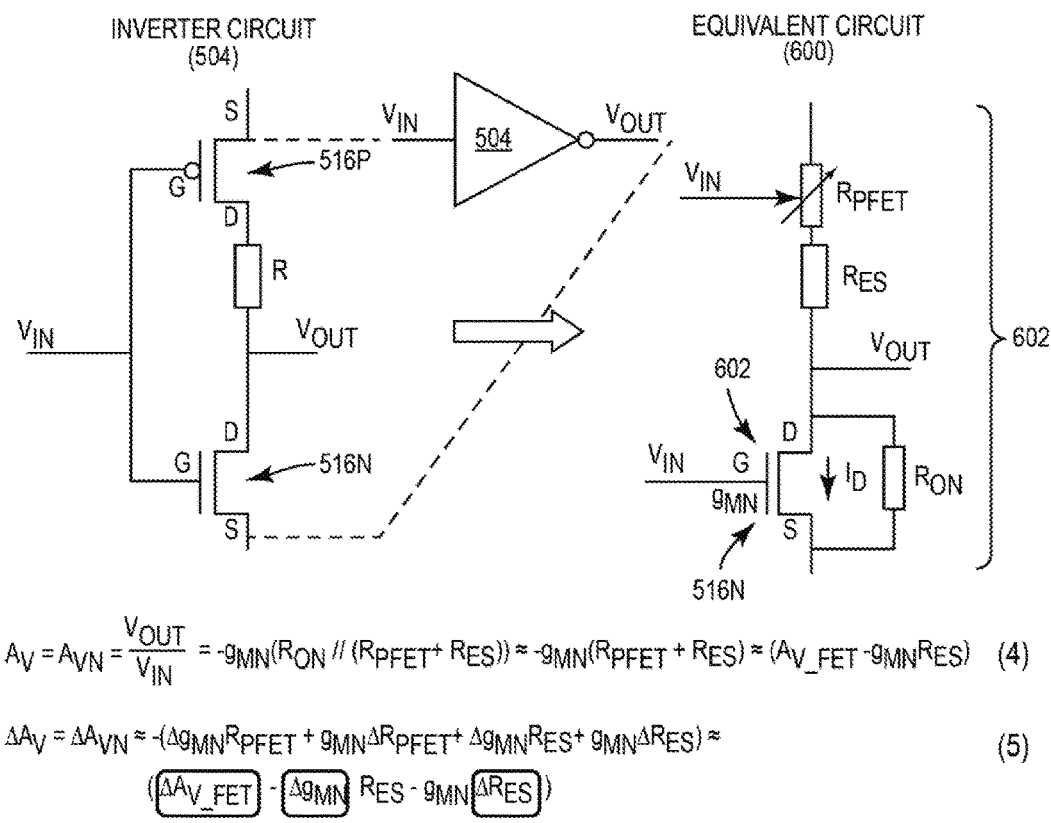
FIG. 6 is a schematic diagram of an inverter circuit in the SRAM bit cell in FIG. 5 modeled with a pull-down NFET as an amplifying transistor having an on resistance and a pull-up PFET as a load resistor to illustrate voltage gain and change in voltage gain of the inverter circuit as a function of gate voltage variation and added passive resistance.

FIG. 6 is schematic diagram of an inverter circuit 504 that can be the inverter circuit 504T or the complement inverter circuit 504C in the SRAM bit cell 500 in FIG. 5 to further illustrate the effect of the added passive resistance (shown as resistor R in FIG. 6 representing either resistor R1 or R2 in the SRAM bit cell 500 in FIG. 5) and complement passive resistance circuits 536T, 536C enhancing the imbalance of the SRAM bit cell 500. In this regard, as shown in FIG. 6, the inverter circuit 504 is modeled in an equivalent circuit 600 with its pull-down NFET 516N as an amplifying transistor 602 having an on resistance $R_{ON}$ when active. The pull-up PFET 516P is modeled as a load resistor $R_{PFET}$. Thus, a voltage gain $A_V$ and change in voltage gain $\Delta A_V$ of the inverter circuit 504 is a function of gate G voltage variation and added passive resistance $R_{ES}$. In the equivalent circuit 600, when an input voltage $V_{IN}$ turns on the pull-down NFET 516N, the pull-down NFET 516N acts as an amplifying transistor with resistance $R_{ON}$ and the pull-up PFET 516P acts as a load resistor with series load resistance $R_{PFET}$. The series load resistance $R_{PFET}$ is a variable resistance influenced by the input voltage $V_{IN}$. The voltage gain $A_V$ of the inverter circuit 504, which is the output voltage $V_{OUT}$ divided by the input voltage $V_{IN}$ ($V_{OUT}/V_{IN}$), can be approximated by equation (4) shown in FIG. 6. As shown in equation (4) in FIG. 6, when the pull-down NFET 516N is turned on, the voltage gain $A_V$ is the current gain $g_{MN}$ (i.e., change in drain current $I_D$ for a given change in input voltage $V_{IN}$) of the pull-down NFET 516N multiplied by the series load resistance $R_{PFET}$ and added passive resistance $R_{ES}$ in parallel with resistance $R_{ON}$. The resistance $R_{ON}$ will be negligible as compared to the series load resistance $R_{PFET}$ when the pull-down NFET 516N is on. Thus, the voltage gain $A_V$ of the pull-down NFET 516N will be approximately the current gain $g_{MN}$ of the pull-down NFET 516N multiplied by the series load resistance $R_{PFET}$ and the added passive resistance $R_{ES}$. Thus, the added passive resistance $R_{ES}$ increases the voltage gain $A_V$ of the inverter circuit 504. The inverter circuit 504 amplifiers the added passive resistance $R_{ES}$ by its current gain $g_{MN}$. Similarly, as shown in equation (5) in FIG. 6, the change in voltage gain $\Delta A_V$ is increased as a result of the added passive resistance $R_{ES}$ in the inverter circuit 504.

Thus, providing the added resistors R1, R2 in the SRAM bit cell 500 in FIG. 5 has the effect of increasing the voltage gain of its inverter and complement inverter circuits 504T, 504C to further increase and enhance any imbalance between the inverter and complement inverter circuits 504T, 504C. This added passive resistance can make the SRAM bit cell 500 generate a more reproducibly consistent output as a PUF output. In one example, each of the resistances of resistors R1 and R2 can be between approximately 0.1 and 20 killiOhms (kOhms) as an example. For example, each of the resistances of resistors R1 and R2 can be between approximately 0.25 and 4 kOhms as another example. However, the resistances of resistors R1 and R2 are not limited to these ranges. The resistors R1 and R2 can also have random process mismatch to further introduce imbalance in the SRAM bit cell 500. Resistors R1 and R2 can be passive resistors, including but not limited to MTJ resistors or resistive RAM (RRAM) resistors as non-liming examples.

In the example of the SRAM bit cell 500 in FIG. 5, the added resistors R1, R2 are not coupled to the source S of the pull-down and complement pull-down NFETs 516N(T), 516N(C) between their source S and the voltage rail 506N due to the source degeneration effect in a common source amplifier configuration. If an added source resistance were coupled to the source S of the pull-down and complement pull-down NFETs 516N(T), 516N(C), a voltage drop would occur across the added source resistances as a result of an input voltage $V_{IN}$ applied to the respective input and complement input nodes 508T, 508C to make the pull-down and complement pull-down NFETs 516N(T), 516N(C) operate more linearly and less voltage gain. This is because the drain current $I_D$ is a square of the difference between an input voltage $V_{IN}$ applied to the respective input and complement input nodes 508T, 508C and an output voltage $V_{OUT}$ on the respective output and complement output nodes 510T, 510C. To enhance the imbalance between the inverter and complement inverter circuits 504T, 504C in the SRAM bit cell 500 in FIG. 5, it is desired for the pull-down and complement pull-down NFETs 516N(T), 516N(C) to have a non-linear gain.

Figure 7:
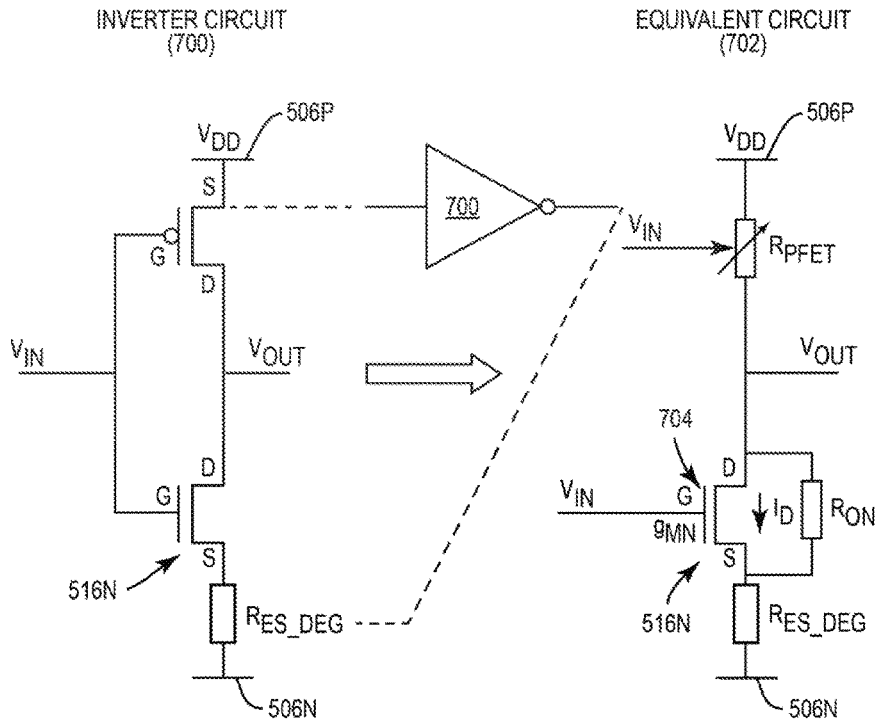
FIG. 7 is an exemplary SRAM bit cell with passive resistance added and coupled to sources of a respective pull-down NFET of cross-coupled inverter circuits to enhance source degeneration of the pull-down NFETs, which reduces sensitivity of an output voltage of the SRAM bit cell to a change in input voltage.

In this regard, FIG. 7 is schematic diagram of an inverter circuit 700 to illustrate the effect if a source degeneration resistance $R_{ES\_DEG}$ were added and coupled to the source S of a pull-down NFET in a common source amplifier configuration. As shown in FIG. 7, the inverter circuit 700 is modeled in an equivalent circuit 702 with its pull-down NFET 516N as an amplifying transistor 704 having an on resistance $R_{ON}$ when active. The pull-up PFET 516P is modeled as a load resistor $R_{PFET}$. Thus, the voltage gain $A_V$ and change in voltage gain $A A_V$ of the inverter circuit 504 is a function of gate G voltage variation and the added source degeneration resistance $R_{ES\_DEG}$. In the equivalent circuit 702, when an input voltage $V_{IN}$ turns on the pull-down NFET 516N, the pull-down NFET 516N acts as an amplifying transistor with resistance $R_{ON}$ and the pull-up PFET 516P acts as a load resistor with series load resistance $R_{PFET}$. The series load resistance $R_{PFET}$ is a variable resistance influenced by the input voltage $V_{IN}$. The voltage gain $A_V$ of the inverter circuit 504, which is the output voltage $V_{OUT}$ divided by the input voltage $V_{IN}$ ($V_{OUT}/V_{IN}$), can be approximated by equation (6) shown in FIG. 7. As shown in equation (6) in FIG. 7, when the pull-down NFET 516N is turned on, due to source degeneration resistance $R_{ES\_DEG}$, the voltage gain $A_V$ is reduced as a function of the increase of the source degeneration resistance $R_{ES\_DEG}$. Thus, the added passive resistance $R_{ES}$ decreases the voltage gain $A_V$ of the inverter circuit 504. Similarly, as shown in equations (7) and (8) in FIG. 7, the change in voltage gain $A A_V$ is decreased as a function of the square of the added passive resistance $R_{ES}$. Thus, if the source degeneration resistance $R_{ES\_DEG}$ were added and coupled to the drains D of the pull-down and complement pull-down NFETs 516N(T), 516N(C) in FIG. 5, this would have the effect of decreasing the voltage gain of its inverter and complement inverter circuits 504T, 504C, thus decreasing any imbalance between the inverter and complement inverter circuits 504T, 504C in an undesired manner in this example.

FIG. 8A is a graph 800 illustrating an exemplary Monte-Carlo simulated PUF output 808 from the output node 510T of the SRAM bit cell 500 in FIG. 5 based on a mismatch between added passive resistance. As shown therein, in an equalization phase 802, the equalization enable signal eq in an equalization enable state is asserted to the equalization input 534 of the equalization circuit 530 to couple the output node 510T and complement output node 510C together. The graph 800 also shows a write setup enable phase 804 of a PUF read operation after the equalization enable signal eq is asserted in an equalization disable state. The PUF output 808 on the output node 510T moving to a logic '1' state in an output phase 806 is shown with a mismatch in resistance of the resistors R1, R2 (e.g., with a target resistance of 4 kOhms) less than 0 kOhms (i.e., resistance of R1<resistance of R2) due to the enhanced imbalance of the SRAM bit cell 500. The PUF output 808 on the output node 510T moving to a logic '0' state is shown with a mismatch in resistance of the resistors R1, R2 (e.g., with a target resistance of 4 kOhms) greater than 0 kOhms (i.e., resistance of R1>resistance of R2) due to the enhanced imbalance of the SRAM bit cell 500.

Figure 8B:
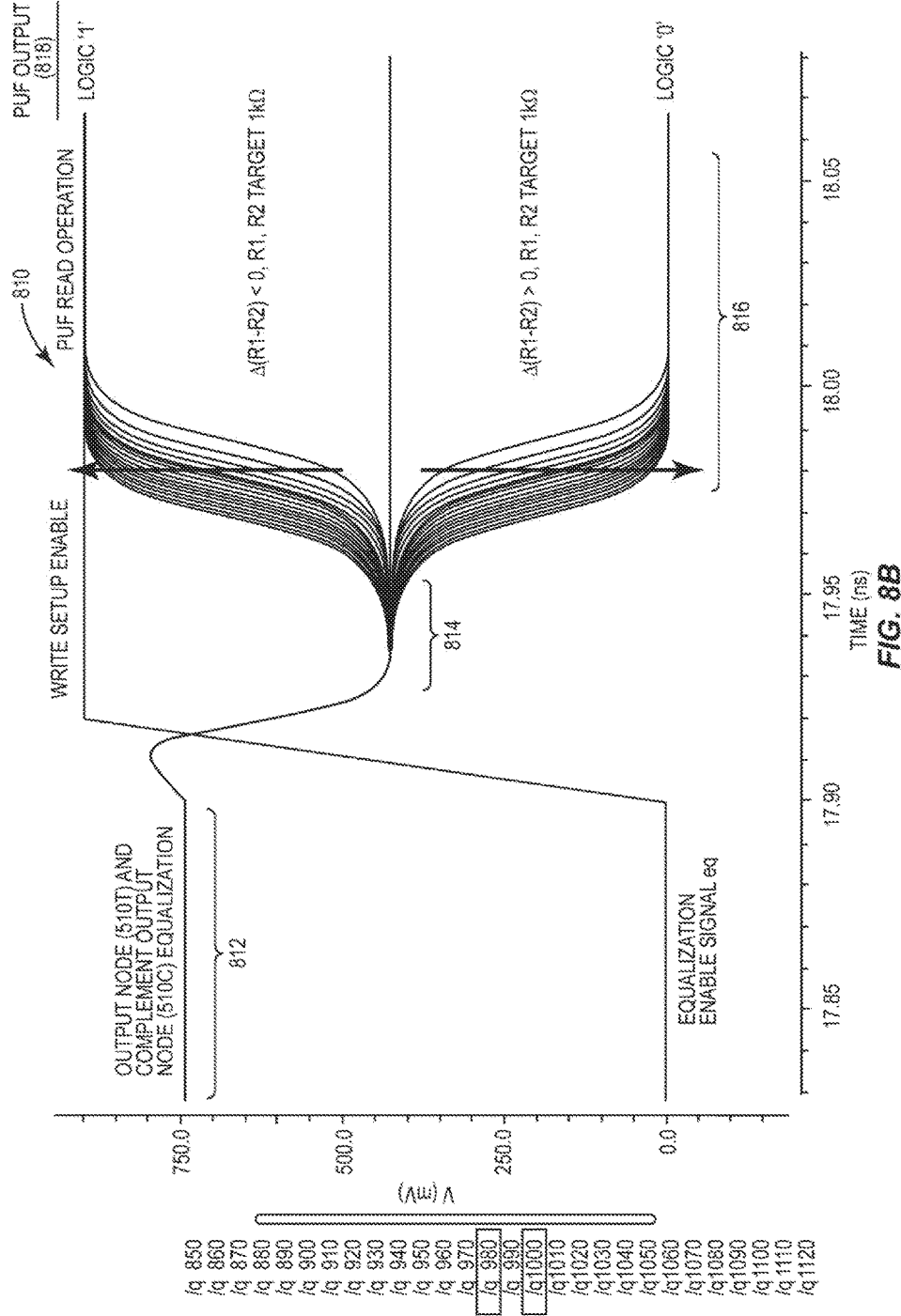

FIG. 8B is another graph 810 illustrating an exemplary Monte-Carlo simulated PUF output 818 from the output node 510T of the SRAM bit cell 500 in FIG. 5 based on a mismatch between added passive resistance. As shown therein, in an equalization phase 812, the equalization enable signal eq in an equalization enable state is asserted to the equalization input 534 of the equalization circuit 530 to couple the output node 510T and complement output node 510C together. The graph 810 also shows a write setup enable phase 814 of a PUF read operation after the equalization enable signal eq is asserted in an equalization disable state. The PUF output 818 on the output node 510T moving to a logic '1' state in an output phase 816 is shown with a mismatch in resistance of the resistors R1, R2 (e.g., a target resistance of 1 kOhm) less than 0 kOhms (i.e., resistance of R1<resistance of R2) due to the enhanced imbalance of the SRAM bit cell 500. The PUF output 818 on the output node 510T moving to a logic '0' state is shown with a mismatch in resistance of the resistors R1, R2 (e.g., a target resistance of 1 kOhm) greater than 0 kOhms (i.e., resistance of R1>resistance of R2) due to the enhanced imbalance of the SRAM bit cell 500.

Figure 8C:
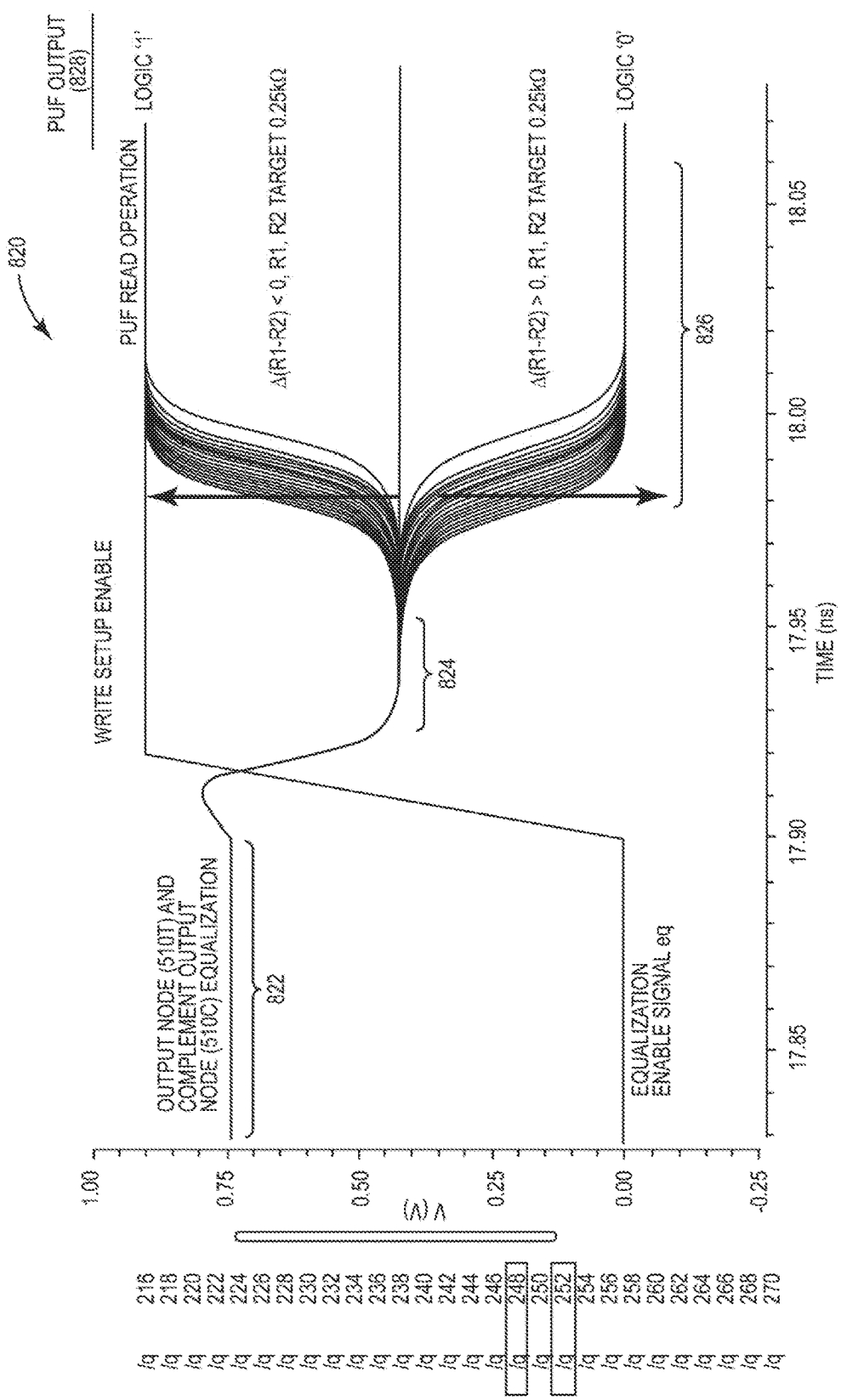

FIG. 8C is another graph 820 illustrating an exemplary Monte-Carlo simulated PUF output 828 from the output node 510T of the SRAM bit cell 500 in FIG. 5 based on a mismatch between added passive resistance. As shown therein, in an equalization phase 822, the equalization enable signal eq in an equalization enable state is asserted to the equalization input 534 of the equalization circuit 530 to couple the output node 510T and complement output node 510C together. The graph 820 also shows a write setup enable phase 824 of a PUF read operation after the equalization enable signal eq is asserted in an equalization disable state. The PUF output 828 on the output node 510T moving to a logic '1' state in an output phase 826 is shown with a mismatch in resistance of the resistors R1, R2 (e.g., a target resistance of 0.25 kOhms) less than 0 kOhms (i.e., resistance of R1<resistance of R2) due to the enhanced imbalance of the SRAM bit cell 500. The PUF output 828 on the output node 510T moving to a logic '0' state is shown with a mismatch in resistance of the resistors R1, R2 (target 0.25 kOhms) greater than 0 kOhms (i.e., resistance of R1>resistance of R2) due to the enhanced imbalance of the SRAM bit cell 500.

Figure 9:
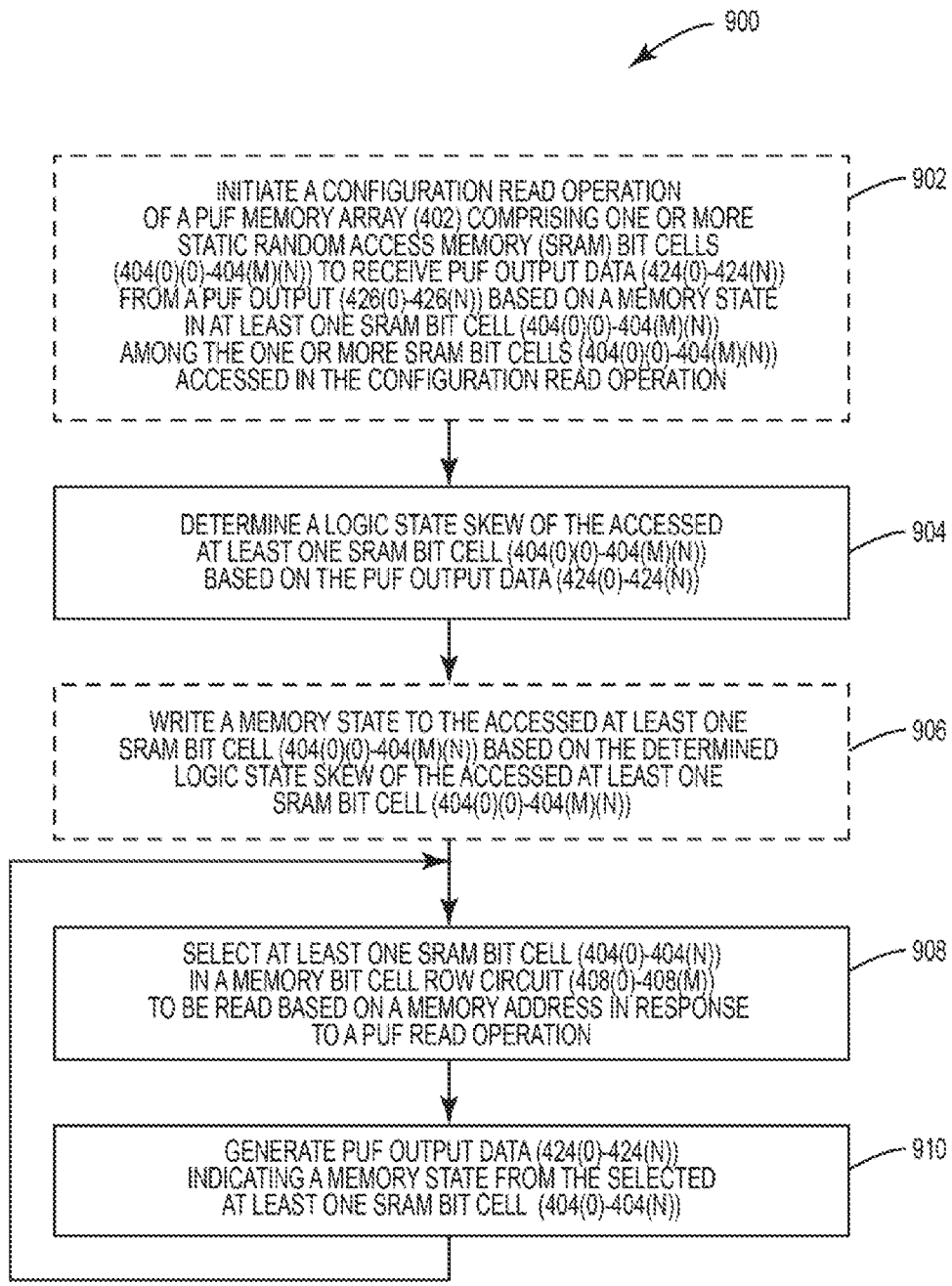
FIG. 9 is a flowchart illustrating an exemplary process of the PUF memory in FIG. 4 performing a PUF initialization operation in an initialization mode to determine a natural logic state skew of the SRAM bit cells in the PUF memory array, and perform PUF read operations in a normal operating mode.

FIG. 9 is a flowchart illustrating an exemplary process 900 of performing a PUF operation on a selected SRAM bit cell 404(0)(0)-404(M)(N) in the PUF memory array 402 in FIG. 4, wherein the SRAM bit cell 404(0)(0)-404(M)(N) may be designed like the SRAM bit cell 500 in FIG. 5 with added passive resistance. In this regard, the process 900 includes an optional step after power-up of the PUF memory 400 of initiating a configuration read operation of a PUF memory array 402 comprising one or more SRAM bit cells 404(0)(0)-404(M)(N) to receive PUF output data 424(0)-424(N) from a PUF output 426(0)-426(N) based on a memory state in at least one SRAM bit cell 404(0)(0)-404(M)(N) among the one or more SRAM bit cells 404(0)(0)-404(M)(N) accessed in the configuration read operation (block 902). This is so that the natural process random variation that causes a logic state skew in the selected SRAM bit cells 404(0)(0)-404(M)(N) can be determined. Note that multiple power-up and power-down cycles may be performed to the PUF memory 400 and a PUF read operation performed to read selected SRAM bit cells 404(0)(0)-404(M)(N) to determine their natural logic state skew statistically in case the natural logic state skew is not the same for each PUF read operation, such as if the selected SRAM bit cells 404(0)(0)-404(M)(N) are weakly skewed. Then, the logic state skew of the accessed at least one SRAM bit cell 404(0)(0)-404(M)(N) is determined based on the PUF output data 424(0)-424(N) in response to the PUF read operation (block 904). The process 900 may next involve optionally writing a memory state to the accessed at least one SRAM bit cell 404(0)(0)-404(M)(N) based on the determined logic state skew of the accessed at least one SRAM bit cell 404(0)(0)-404(M)(N) based on the determined logic state skew (block 906). This is so that at least one SRAM bit cell 404(0)(0)-404(M)(N) is biased towards its natural state skew before a PUF read operation is performed to increase reproducibility. For example, as discussed above and in more detail below, this controlling of the logic state skew of the at least one SRAM bit cell 404(0)(0)-404(M)(N) can be provided by passive resistances added to the at least one SRAM bit cell 404(0)(0)-404(M)(N), such as if the added passive resistances are MTJs or RRAMs as examples, being programmed.

With continuing reference to FIG. 9, the process 900 then involves selecting at least one SRAM bit cell 404(0)-404(N) in a memory bit cell row circuit 408(0)-408(M) among the plurality of memory bit cell row circuits 408(0)-408(M) to be read based on a memory address in response to a PUF read operation (block 908). Then process 900 then involves generating PUF output data 424(0)-424(N) indicating a memory state from the selected at least one SRAM bit cell 404(0)-404(N) in response to the PUF read operation (block 910). Multiple PUF read operations can be performed. In this example, the initiation steps in blocks 902-906 are performed once after the PUF memory 400 is powered-up.

A defined number of PUF read operations can be performed on the SRAM bit cells 404(0)(0)-404(M)(N) in the PUF memory array 402 in FIG. 4 to determine their natural logic state skews. The PUF output data 424(0)-424(N) for a selected SRAM bit cell 404(0)-404(N) can be recorded and analyzed to determine the natural logic state skew. This may take more time and/or involve additional circuits for recording and analyzing natural logic state skews of the selected SRAM bit cell 404(0)-404(N), thereby increasing complexity and power consumption in an undesired manner. As another example, the logic state skew of the SRAM bit cells 404(0)(0)-404(M)(N) could be determined by employing a Bayesian probability analysis as discussed below.

In this regard, FIG. 10A is a table 1000 illustrating an exemplary likelihood probability analysis of the logic state skew stored in the SRAM bit cells 404(0)(0)-404(M)(N) in the PUF memory 400 in FIG. 4 based on different strength comparisons between pull-up and complement pull-up PFETs 516P(T), 516P(C) and pull-down and complement pull-down NFETs 516N(T), 516N(C) in the SRAM bit cell 500 as shown in FIG. 5 if employed in the SRAM bit cells 404(0)(0)-404(M)(N) in the PUF memory 400. As shown in the table 1000, a list of possible conditions 1002 of the SRAM bit cell 500 is shown in terms of whether pull-up PFET 516P(T) (PU1) is stronger than complement pull-up PFET 516P(C) (PU2) 1004, or vice versa 1006. These conditions are provided for a list of possible conditions 1008 of the resistance of resistor R1 being less than R2 (1010) or greater than resistor R2 (1012). For each of these cases, the table 1000 includes a probability percentage 1014 of these possible conditions 1002. As shown in the table 1000, a list of possible conditions 1016 of the SRAM bit cell 500 is shown in terms of whether pull-down NFET 516N(T) (PD1) is stronger than complement pull-down NFET 516N(C) (PD2) 1018, or vice versa 1020. For each of the possible conditions 1002, 1016, the table 1000 includes a probability percentage 1022 of these conditions. Final probabilities 1024 are added up for each logic state skew of '0' or '1'.

Figure 10B:
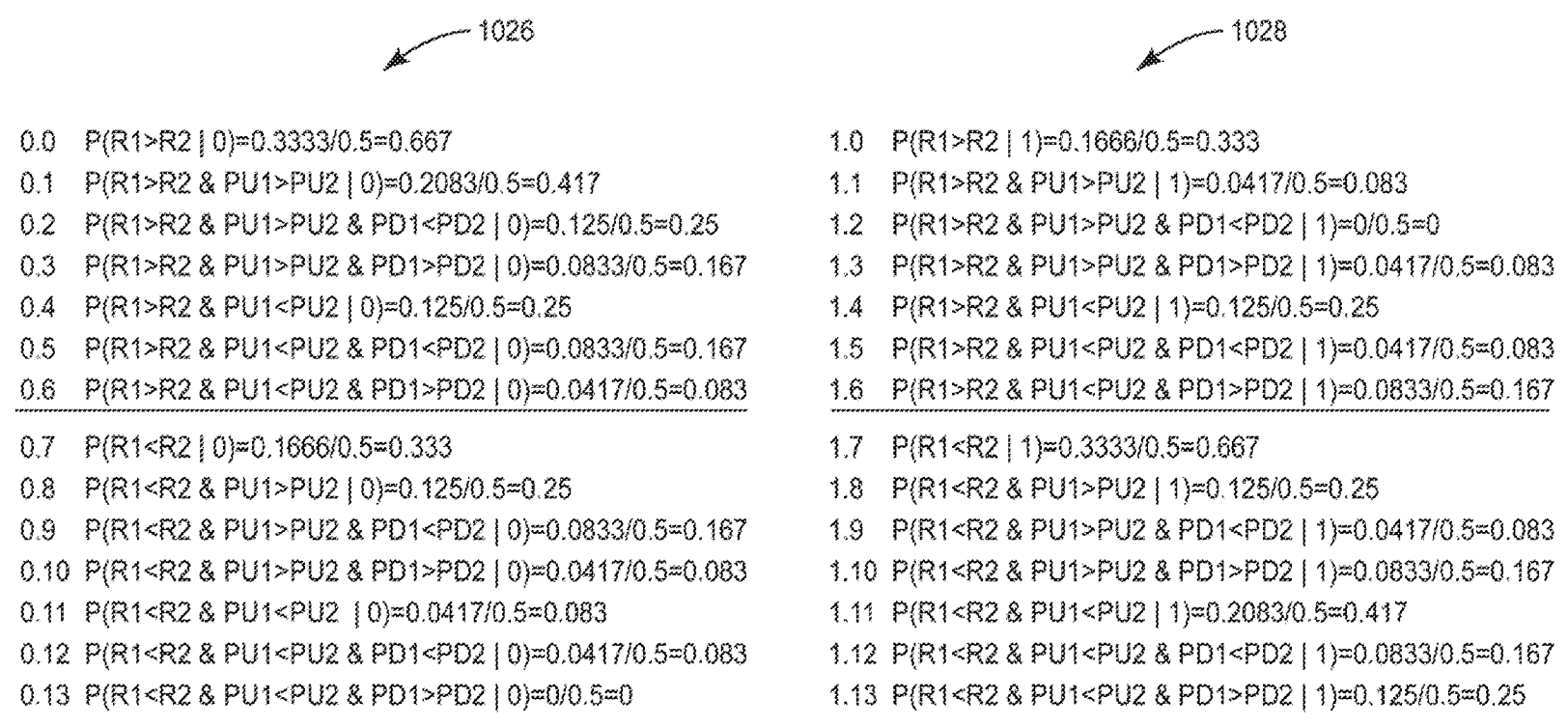

FIG. 10B illustrates exemplary Bayesian probability calculations 1026 of the natural logic state skew of the SRAM bit cell 500 being a logic state '0' based on the likelihood probability analysis in the table 1000 of FIG. 10A and a read logic state stored in the output node 510T in the SRAM bit cell 500 in equations 0.0-0.13. FIG. 10B also illustrates exemplary Bayesian probability calculations 1028 of the natural logic state skew of the SRAM bit cell 500 being a logic state '1' based on the likelihood probability analysis in the table 1000 of FIG. 10A and a read logic state stored in the output node 510T in the SRAM bit cell 500 in equations 1.0-1.13. FIG. 11A illustrates a derivation of formulas 1100 for the Bayesian probability calculations 1026 shown in FIG. 10B for a natural logic state skew of '0' in the SRAM bit cell 500. FIG. 11B illustrates a derivation of formulas 1102 for the Bayesian probability calculations 1028 shown in FIG. 10B for a natural logic state skew of '1' in the SRAM bit cell 500.

Figure 12:
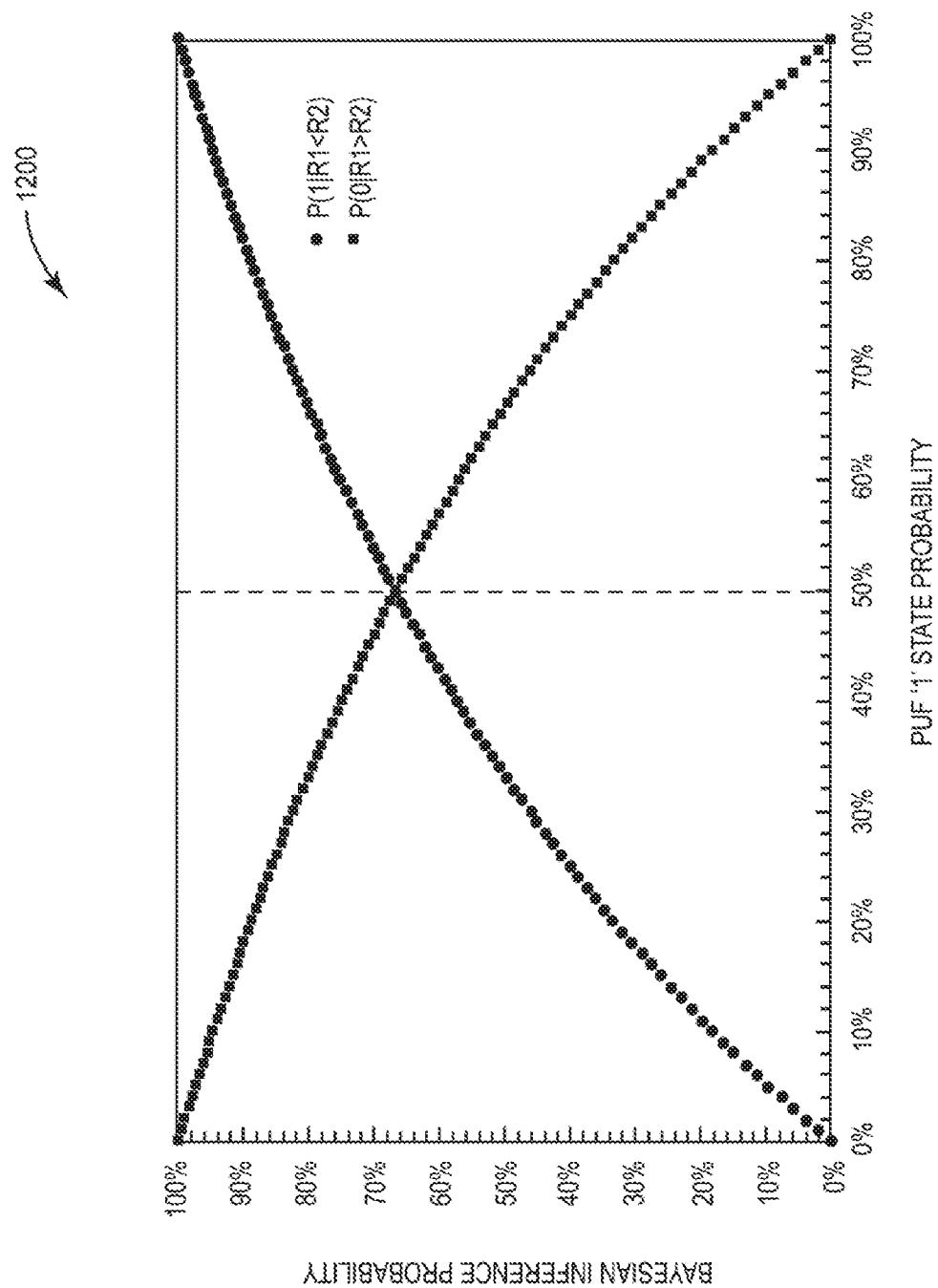
FIG. 12 is a graph illustrating a Bayesian inference probability curve for a natural logic state skew of '1' based on the Bayesian probability calculations in FIGS. 10B and 11B.

FIG. 12 is a graph 1200 illustrating a Bayesian inference probability curve for a natural logic state skew of '1' based on the Bayesian probability calculations 1028 in FIGS. 10B and 11B. The probabilities for a resistance of resistor R1 being less than resistor R2, pull-up PFET 516P(T) (PU1) being weaker than complement pull-up PFET 516P(C) (PU2), and pull-down NFET 516N(T) (PD1) being stronger than complement pull-down NFET 516N(C) (PU2) are the same. The probabilities for a resistance of resistor R1 being greater than resistor R2, pull-up PFET 516P(T) (PU1) being stronger than complement pull-up PFET 516P(C) (PU2), and pull-down NFET 516N(T) (PD1) being weaker than complement pull-down NFET 516N(C) (PU2) are the same. If a logic state skew of the SRAM bit cell 500 being a logic '1 is determined to be less than 50%, providing the resistance of resistor R1 being greater than resistor R2 enhances the logic state skew to '0'. If a logic state skew of the SRAM bit cell 500 being a logic '1 is determined to be greater than 50%, providing the resistance of resistor R1 being less than resistor R2 enhances the logic state skew to '1'. However, to effect this change in operation, the added passive resistance circuits need to have variable resistances that can be set or programmed.

Figure 13:
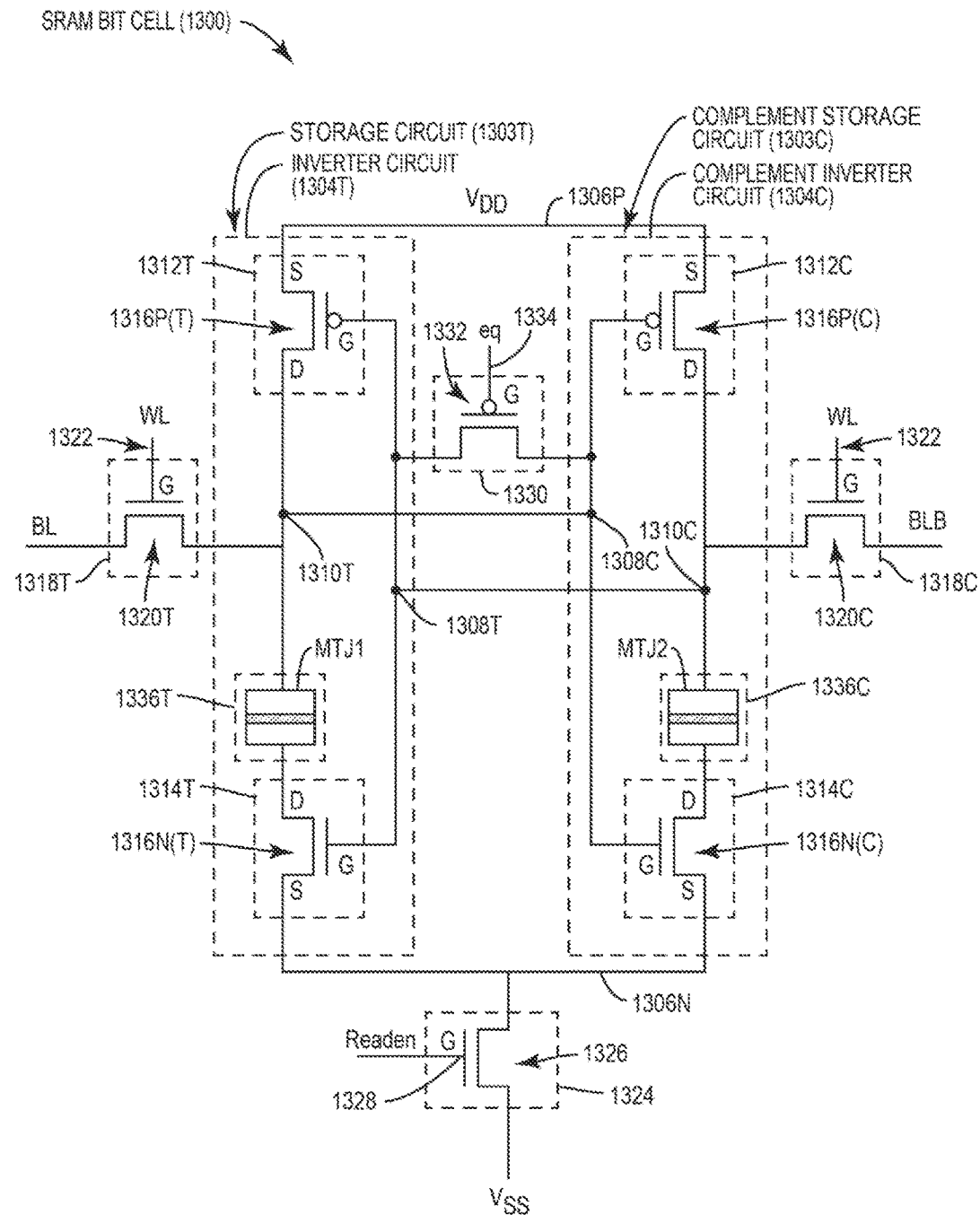
FIG. 13 is another exemplary SRAM bit cell that can be employed as the SRAM bit cells in the PUF memory array of the PUF memory in FIG. 4, wherein passive resistance in the form of magnetic tunnel junctions (MTJs) is added and coupled to drains of respective pull-up PFETs and pull-down NFETs of cross-coupled inverter circuits to enhance imbalance between transistors in the inverter circuits.

In this regard, FIG. 13 illustrates an exemplary SRAM bit cell 1300 that can be employed as the SRAM bit cells 404(0)(0)-404(M)(N) in the PUF memory array 402 of the PUF memory 400 in FIG. 4. The SRAM bit cell 1300 includes a storage circuit 1303T and a complement storage circuit 1303C. The complement storage circuit 1303C is configured to store a logic value in the form of a charge voltage that is the complement of the logic value in the form of a charge voltage stored in the storage circuit 1303T. In this example, the storage circuit 1303T and complement storage circuit 1303C are a respective inverter circuit 1304T and complement inverter circuit 1304C. As shown therein and discussed in more detail below, passive resistances in the form of passive resistance and complement passive resistance circuits 1336T, 1336C are added to the SRAM bit cell 1300 to enhance imbalance between transistors in the inverter circuit 1304T and the complement inverter circuit 1304C provided therein. However, in this example, passive resistance and complement passive resistance circuits 1336T, 1336C are provided in the form of magnetic tunnel junctions (MTJ) MTJ1, MTJ2. In this manner, the resistances of the magnetic tunnel junctions MTJ1, MTJ2 can be programmed to adjust the resistance of the passive resistance and complement passive resistance circuits 1336T, 1336C to change or further enhance the imbalance of the SRAM bit cell 1300.

In this example, the SRAM bit cell 1300 is a 6-transistor (T) (6-T) static complement memory bit cell. The SRAM bit cell 1300 includes cross-coupled inverter and complement inverter circuits 1304T, 1304C powered by a positive supply voltage $V_{DD}$ on a positive supply voltage rail 1306P. The inverter and complement inverter circuits 1304T, 1304C each include respective input and complement input nodes 1308T, 1308C, and respective output and complement output nodes 1310T, 1310C. The inverter and complement inverter circuits 1304T, 1304C are each configured to generate a signal representing data on its respective output and complement output nodes 1310T, 1310C that is an inverted logic state of a signal representing data on its respective input and complement input nodes 1308T, 1308C. The inverter and complement inverter circuits 1304T, 1304C reinforce each other to retain data in the form of a voltage on a respective output node 1310T and a complement output node 1310C by their respective output and complement output nodes 1310T, 1310C being coupled to the respective complement input and input nodes 1308C, 1308T. The inverter and complement inverter circuits 1304T, 1304C in this example are each comprised of a respective pull-up circuit 1312T and complement pull-up circuit 1312C coupled to a respective pull-down circuit 1314T and complement pull-down circuit 1314C. In this example, the pull-up and complement pull-up circuits 1312T, 1312C are respective pull-up PFET and complement pull-up PFETs 1316P(T), 1316P(C), and the pull-down and complement pull-down circuits 1314T, 1314C are respective pull-down NFET and complement pull-down NFETs 1316N(T), 1316N (C). The pull-up PFET and complement pull-up PFET 1316P(T), 1316P(C) are both coupled to the positive supply voltage rail 1306P configured to receive the positive supply voltage $V_{DD}$. The pull-down NFET and complement pull-down NFET 1316N(T), 1316N(C) are coupled to a supply voltage rail 1306N, which may be a ground node or a negative supply voltage for example. An access circuit 1318T and complement NFET access circuit 1318C in the form of NFET access and complement NFET access transistors 1320T, 1320C are coupled to the respective inverter and complement inverter circuits 1304T, 1304C to provide read and write access to the SRAM bit cell 1300. The NFET access and complement NFET access transistors 1320T, 1320C are coupled to a respective bit line BL and complement bit line BLB, which may be a bit line BL and a complement bit line BLB in the PUF memory array 402 corresponding to one of the memory bit cell column circuits 410(0)-410(N) in FIG. 4.

With continuing reference to FIG. 13, in a read operation to the SRAM bit cell 1300, the bit lines BL and complement bit lines BLB are pre-charged to a same value, which in this example is a voltage based on the positive supply voltage $V_{DD}$. Then, a word line signal 1322 of a word line enable state (e.g., a higher voltage value) is asserted on a word line WL coupled to gates G of the NFET access and complement NFET access transistors 1320T, 1320C to evaluate the differential voltages on the output node 1310T and complement output node 1310C to read the SRAM bit cell 1300. Activation of the NFET access and complement NFET access transistors 1320T, 1320C will couple the respective bit line BL and complement bit line BLB to the output node 1310T and complement output node 1310C. Deactivation of the NFET access and complement NFET access transistors 1320T, 1320C will decouple the respective bit line BL and complement bit line BLB from the output node 1310T and complement output node 1310C. If a logic high voltage level (i.e., a '1') is stored at the output node 1310T, a logic low voltage level (i.e., '0') is stored at the complement output node 1310C. If a logic low voltage level (i.e., a '0') is stored at the output node 1310T, a logic high voltage level (i.e., '1') is stored at the complement output node 1310C. Activation of the word line WL will cause the NFET access and complement NFET access transistors 1320T, 1320C to discharge the pre-charged voltage on the respective bit line BL or complement bit line BLB to the respective output or complement output nodes 1310T, 1310C and through the respective NFET access and complement NFET access transistors 1320T, 1320C to the supply voltage rail 1306N.

With continuing reference to FIG. 13, in a write operation to the SRAM bit cell 1300, the bit lines BL and complement bit lines BLB are charged with write data to be written to the output or complement output nodes 1310T, 1310C. The write data charged on bit lines BL and complement bit lines BLB has complementary logic values unlike when a read operation is performed. Then, the word line signal 1322 of a word line enable state (e.g., a higher voltage value) is asserted on a word line WL coupled to gates G of the NFET access and complement NFET access transistors 1320T, 1320C. If a logic high voltage level (i.e., a '1') is stored at the output node 1310T, a logic low voltage level (i.e., '0') is stored at the complement output node 1310C. If a logic low voltage level (i.e., a '0') is stored at the output node 1310T, a logic high voltage level (i.e., '1') is stored at the complement output node 1310C. Activation of the word line WL will cause the write data on the bit line BL and complement bit line BLB to pass through the NFET access and complement NFET access transistors 1320T, 1320C to the output or complement output nodes 1310T, 1310C.

With continuing reference to FIG. 13, the SRAM bit cell 1300 also includes a read enable control circuit 1324 in the form of an NFET 1326 in this example. The NFET 1326 is coupled between sources S of the pull-down and complement pull-down NFETs 1316N(T), 1316N(C) and the supply voltage rail 1306N to control when the SRAM bit cell 1300 is activated. A gate G of the NFET 1326 is configured to receive a read enable signal Readen on a read enable input 1328. Also as shown in FIG. 13, the SRAM bit cell 1300 further includes an equalization circuit 1330, which is a PFET 1332 in this example. The equalization circuit 1330 includes an equalization input 1334, which is coupled to a gate G of the PFET 1332. The equalization circuit 1330 is coupled to the input node 1308T and the complement input node 1308C. The equalization circuit 1330 is configured to couple the input node 1308T to the complement input node 1308C in response to an equalization enable signal eq on the equalization input 1334 indicating an equalization enable state, and decouple the input node 1308T from the complement input node 1308C in response to the equalization enable signal eq on the equalization input 1334 indicating an equalization disable state. The equalization circuit 1330 can be activated to couple the input node 1308T to the complement input node 1308C in response to a PUF read operation so that the respective complement output node 1310C and output node 1310T are forced to start at the same data value before a read operation occurs. The natural logic state skew of the SRAM bit cell 1300 will control the ultimate data values on the output node 1310T and complement output node 1310C.

With continuing reference to FIG. 13, the imbalance of the inverter and complement inverter circuits 1304T, 1304C in the SRAM bit cell 1300 is a function of the resistance mismatch between the same type, complementary transistors in the inverter and complement inverter circuits 1304T, 1304C. Ideally, the inverter and complement inverter circuits 1304T, 1304C in the SRAM bit cell 1300 will be symmetrically matched so that the SRAM bit cell 1300 is not skewed to favor settling to one voltage state over the other. However, process variations can cause the pull-up and complementary pull-up PFETs 1316P(T), 1316P(C) and pull-down and complementary pull-down NFETs 1316N(T), 1316N(C) in the inverter and complement inverter circuits 1304T, 1304C in the SRAM bit cell 1300 to be mismatched, and thus be skewed towards one voltage state. Thus, the SRAM bit cell 1300 can be used to provide memory cells in the PUF memory 400 in FIG. 4 by taking advantage of this imbalance in the inverter and complement inverter circuits 1304T, 1304C that will occur through process variation. However, imbalance may not be large enough such that that reproducibility of the SRAM bit cell 1300 is consistent. The SRAM bit cell 1300 should ideally provide reproducible outputs even under hostile conditions, such as high temperature.

In this regard, to enhance the imbalance between the inverter and complement inverter circuits 1304T, 1304C in the SRAM bit cell 1300 in FIG. 13, the passive and complement passive resistance circuits 1336T, 1336C are added. In this example, the passive and complement passive resistance circuits 1336T, 1336C are added in the form of MTJs MTJ1, MTJ2 each having a respective resistance, as shown in FIG. 13. In this example, the passive resistance circuit 1336T is coupled to the pull-up circuit 1312T and the pull-down circuit 1314T. The complement passive resistance circuit 1336C is coupled to the complement pull-up circuit 1312C and the complement pull-down circuit 1314C. More specifically, in this example, the passive resistance circuit 1336T is coupled between the drain D of the pull-down NFET 1316N(T) and the output node 1310T of the inverter circuit 1304T, wherein the output node 1310T is also coupled to the drain D of the pull-up PFET 1316P(T). Similarly, in this example, the complement passive resistance circuit 1336C is coupled between the drain D of the complement pull-down NFET 1316N(C) and the complement output node 1310C of the complement inverter circuit 1304C, wherein the complement output node 1310C is also coupled to the drain D of the complement pull-up PFET 1316P(C).

Figure 14:
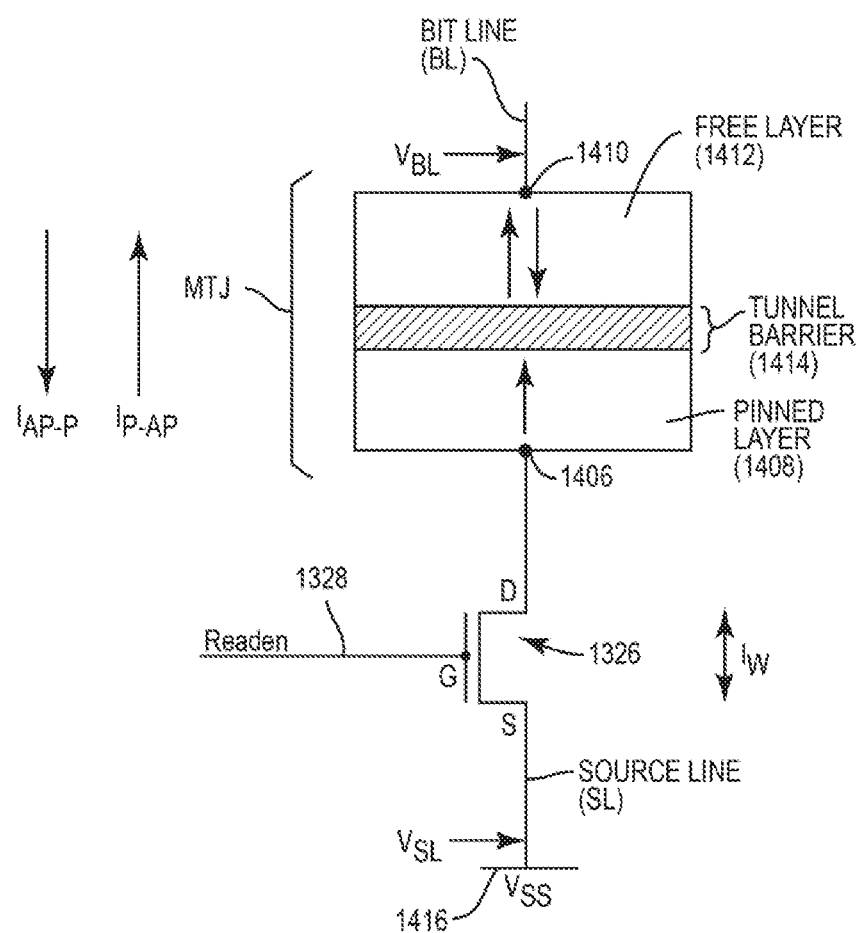
FIG. 14 is a schematic diagram of a pull-down NFET in the SRAM bit cell in FIG. 13 coupled to an MTJ to illustrate write operations to the MTJ to program its resistance to a desired resistance state.

FIG. 14 illustrates a more detailed, exemplary diagram of the MTJs MTJ1, MTJ2 added in the SRAM bit cell 1300 in FIG. 13 to discuss how the resistances of such MTJs MTJ1, MTJ2 can be programmed. In this example, the MTJ in FIG. 13 is a spin-transfer torque (STT) (STT-MTJ) device wherein the spin polarization of carrier electrons, rather than a pulse of a magnetic field, is used current to program the state stored in the MTJ device (i.e., a '0' or a '1'). The read enable control circuit 1324 controls reading and writing to the MTJ. A drain D of the read enable control circuit 1324 is coupled to a bottom electrode 1406 of the MTJ, which is coupled to a pinned layer 1408 having a fixed or pinned magnetization direction. A read enable signal Readen on the read enable input 1328 is coupled to a gate G of the read enable control circuit 1324. A source S of the read enable control circuit 1324 is coupled to a voltage rail 1416 to a negative supply voltage $V_{SS}$ (which may be a ground node) through a source line SL. A bit line BL is coupled to a top electrode 1410 of the MTJ, which is coupled to a free layer 1412 for example. The pinned layer 1408 and the free layer 1412 are separated by a tunnel barrier 1414.

With continuing reference to FIG. 14, the resistance of the MTJ can be programmed by a write operation. The gate G of the read enable control circuit 1324 is activated by activating the read enable signal Readen. A write voltage differential between a voltage $V_{BL}$ on the bit line BL and the voltage $V_{SL}$ on the source line SL is applied to generate a write signal $I_w$ between the drain D and the source S of the read enable control circuit 1324 sufficient to change the magnetic orientation of the MTJ. If the magnetic orientation (i.e., direction) of the MTJ is to be changed from anti-parallel (AP) to parallel (P), a write current $I_{AP-P}$ flowing from the free layer 1412 to the pinned layer 1408 is generated. This induces an STT at the free layer 1412 to change the magnetic orientation of the free layer 1412 to P with respect to the pinned layer 1408. If the magnetic orientation is to be changed from P to AP, a current $I_{P-AP}$ flowing from the pinned layer 1408 to the free layer 1412 is produced, which induces an STT at the free layer 1412 to change the magnetic orientation of the free layer 1412 to AP with respect to the pinned layer 1408. The resistance of the MTJ is based on the magnetic orientation of the free layer 1412. If the magnetic orientations of the MTJ's free layer 1412 and pinned layer 1408 are oriented P to each other, the MTJ presents a lower resistance than the resistance the MTJ would present if the magnetic orientations of the free layer 1412 and the pinned layer 1408 were in an AP magnetic orientation. The two different resistances represent a logic '0' and a logic '1' stored in the MTJ that can be used to provide the added passive resistance in the SRAM bit cell 1300 in FIG. 13.

Figure 15:
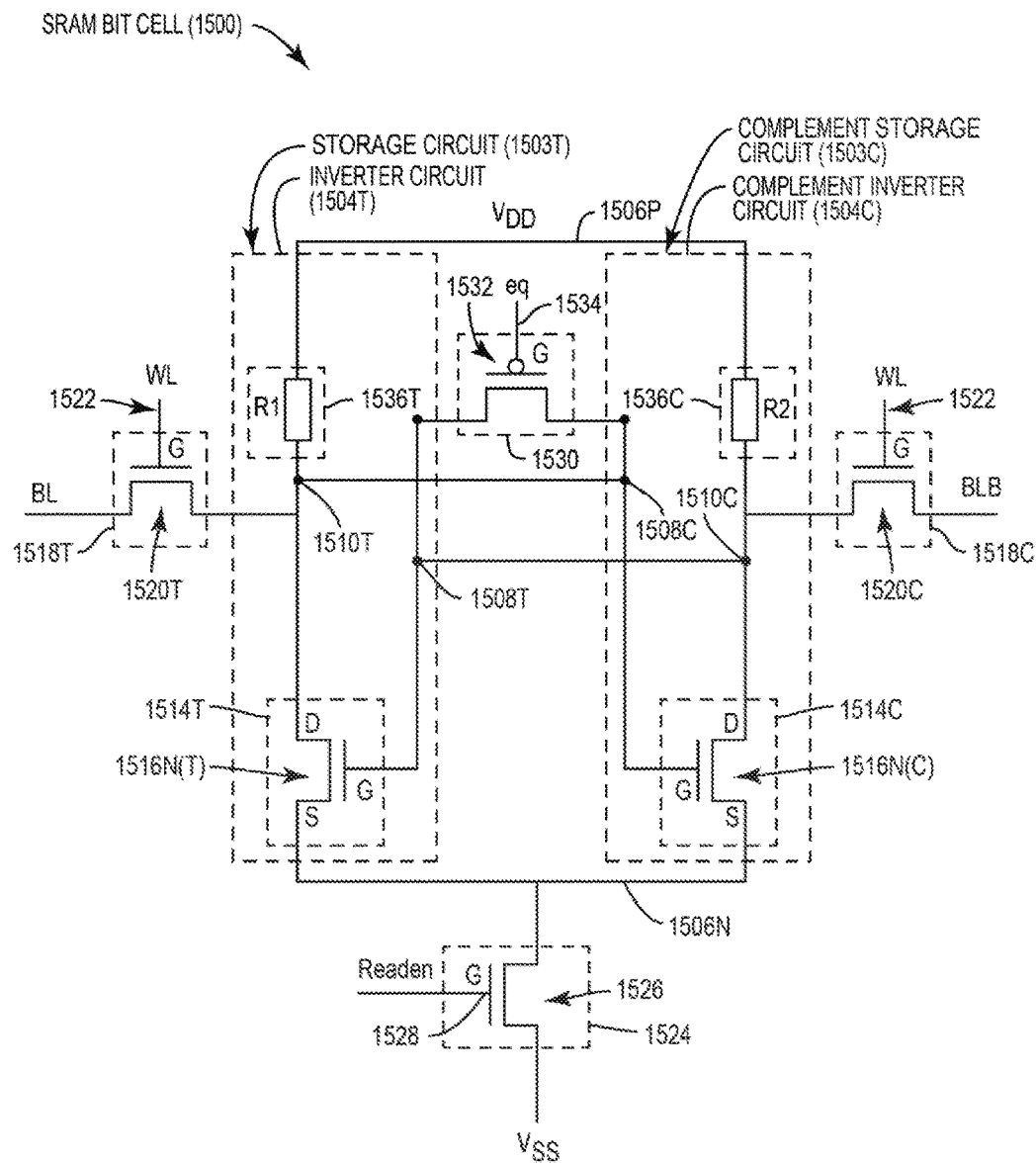
FIG. 15 is another exemplary SRAM bit cell that can be employed as the SRAM bit cells in the PUF memory array of the PUF memory in FIG. 4, wherein passive resistance in the form of resistors is added and coupled to drains of respective pull-down NFETs to enhance imbalance between NFETs.

FIG. 15 illustrates yet another exemplary SRAM bit cell 1500 that can be employed as the SRAM bit cells 404(0)(0)-404(M)(N) in the PUF memory array 402 of the PUF memory 400 in FIG. 4. The SRAM bit cell 1500 includes a storage circuit 1503T and a complement storage circuit 1503C. The complement storage circuit 1503C is configured to store a logic value in the form of a charge voltage that is the complement of the logic value in the form of a charge voltage stored in the storage circuit 1503T. In this example, the storage circuit 1503T and complement storage circuit 1503C are a respective inverter circuit 1504T and complement inverter circuit 1504C. As shown therein and discussed in more detail below, passive resistances in the form of passive resistance and complement passive resistance circuits 1536T, 1536C are added to the SRAM bit cell 1500 similar to the SRAM bit cell 500 in FIG. 5 to enhance imbalance between transistors in an inverter circuit 1504T and complement inverter circuit 1504C provided therein. However, in the SRAM bit cell 1500 in FIG. 15, the passive resistance and complement passive resistance circuits 1536T, 1536C replace what were the pull-up circuits 512T, 512C in the SRAM bit cell 500 in FIG. 5. In this example, the SRAM bit cell 1500 is a 4-transistor (T) (4-T) static complement memory bit cell.

With reference to FIG. 15, the SRAM bit cell 1500 includes cross-coupled inverter and complement inverter circuits 1504T, 1504C powered by a positive supply voltage $V_{DD}$ on a positive supply voltage rail 1506P. The inverter and complement inverter circuits 1504T, 1504C each include respective input and complement input nodes 1508T, 1508C, and respective output and complement output nodes 1510T, 1510C. The inverter and complement inverter circuits 1504T, 1504C are each configured to generate a signal representing data on its respective output and complement output nodes 1510T, 1510C that is an inverted logic state of a signal representing data on its respective input and complement input nodes 1508T, 1508C. The inverter and complement inverter circuits 1504T, 1504C reinforce each other to retain data in the form of a voltage on a respective output node 1510T and a complement output node 1510C by their respective output and complement output nodes 1510T, 1510C being coupled to the respective complement input and input nodes 1508C, 1508T. The inverter and complement inverter circuits 1504T, 1504C in this example are each comprised of a respective pull-down circuit 1514T and complement pull-down circuit 1514C. In this example, pull-up and complement pull-up circuits like those included in the SRAM bit cells 500, 1300 in FIGS. 5 and 13 are not included. The pull-down and complement pull-down circuits 1514T, 1514C are respective pull-down NFET and complement pull-down NFET 1516N(T), 1516N (C). The pull-down NFET and complement pull-down NFETs 1516N(T), 1516N(C) may be a ground node or a negative supply voltage for example. An access circuit 1518T and complement NFET access circuit 1518C in the form of NFET access and complement NFET access transistors 1520T, 1520C are coupled to the respective inverter and complement inverter circuits 1504T, 1504C to provide read and write access to the SRAM bit cell 1500. The NFET access and complement NFET access transistors 1520T, 1520C are coupled to a respective bit line BL and complement bit line BLB, which may be a bit line BL and a complement bit line BLB in the PUF memory array 402 corresponding to one of the memory bit cell column circuits 410(0)-410(N) in FIG. 4.

With continuing reference to FIG. 15, in a read operation to the SRAM bit cell 1500, the bit lines BL and complement bit lines BLB are pre-charged to a same value, which in this example is a voltage based on the positive supply voltage $V_{DD}$. Then, a word line signal 1522 of a word line enable state (e.g., a higher voltage value) is asserted on a word line WL coupled to gates G of the NFET access and complement NFET access transistors 1520T, 1520C to evaluate the differential voltages on the output node 1510T and complement output node 1510C to read the SRAM bit cell 1500. Activation of the NFET access and complement NFET access transistors 1520T, 1520C will couple the respective bit line BL and complement bit line BLB to the output node 1510T and complement output node 1510C. Deactivation of the NFET access and complement NFET access transistors 1520T, 1520C will decouple the respective bit line BL and complement bit line BLB from the output node 1510T and complement output node 1510C. If a logic high voltage level (i.e., a '1') is stored at the output node 1510T, a logic low voltage level (i.e., '0') is stored at the complement output node 1510C. If a logic low voltage level (i.e., a '0') is stored at the output node 1510T, a logic high voltage level (i.e., '1') is stored at the complement output node 1510C. Activation of the word line WL will cause the NFET access and complement NFET access transistors 1520T, 1520C to discharge the pre-charged voltage on the respective bit line BL or complement bit line BLB to the respective output or complement output nodes 1510T, 1510C and through the respective NFET access and complement NFET access transistors 1520T, 1520C to the voltage rail 1506N.

With continuing reference to FIG. 15, in a write operation to the SRAM bit cell 1500, the bit lines BL and complement bit lines BLB are charged with write data to be written to the output or complement output nodes 1510T, 1510C. The write data charged on bit lines BL and complement bit lines BLB has complementary logic values unlike when a read operation is performed. Then, the word line signal 1522 of a word line enable state (e.g., a higher voltage value) is asserted on a word line WL coupled to gates G of the NFET access and complement NFET access transistors 1520T, 1520C. If a logic high voltage level (i.e., a '1') is stored at the output node 1510T, a logic low voltage level (i.e., '0') is stored at the complement output node 1510C. If a logic low voltage level (i.e., a '0') is stored at the output node 1510T, a logic high voltage level (i.e., '1') is stored at the complement output node 1510C. Activation of the word line WL will cause the write data on the bit line BL and complement bit line BLB to pass through the NFET access and complement NFET access transistors 1520T, 1520C to the output or complement output nodes 1510T, 1510C.

With continuing reference to FIG. 15, the SRAM bit cell 1500 also includes a read enable control circuit 1524 in the form of an NFET 1526 in this example. The NFET 1526 is coupled between sources S of the pull-down and complement pull-down NFETs 1516N(T), 1516N(C) and the voltage rail 1506N to control when the SRAM bit cell 1500 is activated. A gate G of the NFET 1526 is configured to receive a read enable signal Readen on a read enable input 1528. Also as shown in FIG. 15, the SRAM bit cell 1500 further includes an equalization circuit 1530, which is a PFET 1532 in this example. The equalization circuit 1530 includes an equalization input 1534, which is coupled to a gate G of the PFET 1532. The equalization circuit 1530 is coupled to the input node 1508T and the complement input node 1508C. The equalization circuit 1530 is configured to couple the input node 1508T to the complement input node 1508C in response to an equalization enable signal eq on the equalization input 1534 indicating an equalization enable state, and decouple the input node 1508T from the complement input node 1508C in response to the equalization enable signal eq on the equalization input 1534 indicating an equalization disable state. The equalization circuit 1530 can be activated to couple the input node 1508T to the complement input node 1508C in response to a PUF read operation so that the respective complement output node 1510C and output node 1510T are forced to start at the same data value before a read operation occurs. The natural logic state skew of the SRAM bit cell 1500 will control the ultimate data values on the output node 1510T and complement output node 1510C.

With continuing reference to FIG. 15, the imbalance of the inverter and complement inverter circuits 1504T, 1504C in the SRAM bit cell 1500 is a function of the resistance mismatch between the same type, complementary transistors in the inverter and complement inverter circuits 1504T, 1504C. Ideally, the inverter and complement inverter circuits 1504T, 1504C in the SRAM bit cell 1500 will be symmetrically matched so that the SRAM bit cell 1500 is not skewed to favor settling to one voltage state over the other. However, process variations can cause the pull-down and complement pull-down NFETs 1516N(T), 1516N(C) in the inverter and complement inverter circuits 1504T, 1504C in the SRAM bit cell 1500 to be mismatched, and thus be skewed towards one voltage state. Thus, the SRAM bit cell 1500 can be used to provide memory cells in the PUF memory 400 in FIG. 4 by taking advantage of this imbalance in the inverter and complement inverter circuits 1504T, 1504C that will occur through process variation. However, imbalance may not be large enough such that the reproducibility of the SRAM bit cell 1500 is consistent. The SRAM bit cell 1500 should ideally provide reproducible outputs even under hostile conditions, such as high temperature.

In this regard, to enhance the imbalance between the inverter and complement inverter circuits 1504T, 1504C in the SRAM bit cell 1500 in FIG. 15, the passive and complement passive resistance circuits 1536T, 1536C are added. In this example, the passive and complement passive resistance circuits 1536T, 1536C are added in the form of resistors R1, R2 each having a respective resistance, as shown in FIG. 15. In this example, the passive resistance circuit 1536T is coupled to and between the positive supply voltage rail 1506P and the pull-down circuit 1514T. The complement passive resistance circuit 1536C is coupled to and between the positive supply voltage rail 1506P and the complement pull-down circuit 1514C. More specifically, in this example, the passive resistance circuit 1536T is coupled between the drain D of the pull-down NFET 1516N(T) and the positive supply voltage rail 1506P of the inverter circuit 1504T. Similarly, in this example, the complement passive resistance circuit 1536C is coupled between the drain D of the complement pull-down NFET 1516N(C) and the positive supply voltage rail 1506P.

Figure 16:
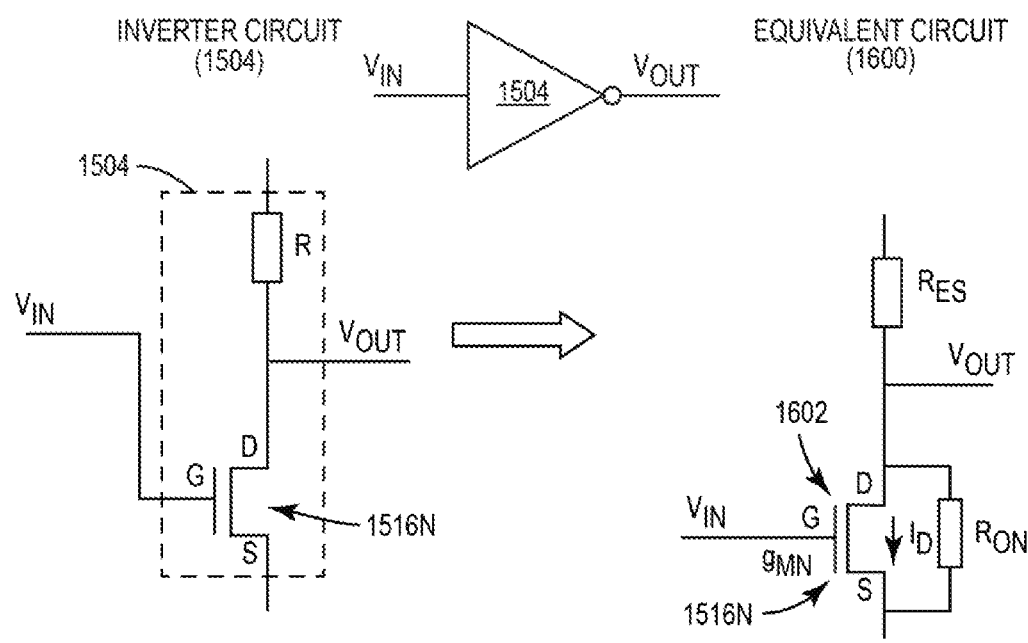
FIG. 16 is schematic diagram of the SRAM bit cell in FIG. 15 modeled with the pull-down NFET as an amplifying transistor having an on resistance and an added passive resistor as a load resistor to illustrate voltage gain and change in voltage gain of the inverter circuit as a function of gate voltage variation and the added passive resistance.

FIG. 16 is schematic diagram of an inverter circuit 1504 that can be the inverter circuit 1504T or the complement inverter circuit 1504C in the SRAM bit cell 1500 in FIG. 15 to further illustrate the effect of the added passive and complement passive resistance circuits 1536T, 1536C (shown as resistor R in FIG. 16 representing either resistor R1 or R2 in the SRAM bit cell 1500 in FIG. 15) enhancing the imbalance of the SRAM bit cell 1500. In this regard, as shown in FIG. 16, the inverter circuit 1504 is modeled in an equivalent circuit 1600 with its pull-down NFET 1516N as an amplifying transistor 1602 having an on resistance $R_{ON}$ when active. An added passive resistor R is modeled as a load resistance $R_{ES}$. Thus, the voltage gain $A_V$ and change in voltage gain $\Delta A_V$ of the inverter circuit 1504 as a function of gate G voltage variation and the added passive load resistance $R_{ES}$. In the equivalent circuit 1600, when an input voltage $V_{IN}$ turns on the pull-down NFET 1516N, the series load resistance $R_{ES}$ is a variable resistance influenced by the input voltage $V_{IN}$. The voltage gain $A_V$ of the inverter circuit 1504, which is the output voltage $V_{OUT}$ divided by the input voltage $V_{IN}$ ($V_{OUT}/V_{IN}$), can be approximated by equation (9) shown in FIG. 16. As shown in equation (9) in FIG. 16, when the pull-down NFET 1516N is turned on, the voltage gain $A_V$ is the current gain $g_{MN}$ (i.e., change in drain current $I_D$ for a given change in input voltage $V_{IN}$) of the pull-down NFET 1516N multiplied by the series load resistance $R_{ES}$ and added passive resistance $R_{ES}$ in parallel with resistance $R_{ON}$. The resistance $R_{ON}$ will be negligible as compared to the series load resistance $R_{ES}$ when the pull-down NFET 1516N is on. Thus, the voltage gain $A_V$ of the pull-down NFET 1516N will be approximately the current gain $g_{MN}$ of the pull-down NFET 1516N multiplied by the added passive resistance $R_{ES}$. Thus, the added passive resistance $R_{ES}$ increases the voltage gain $A_V$ of the inverter circuit 1504. The inverter circuit 1504 amplifiers the added passive resistance $R_{ES}$ by its current gain $g_{MN}$. Similarly, as shown in equation (10) in FIG. 16, the change in voltage gain $\Delta A_V$ is increased as a result of the added passive resistance $R_{ES}$ in the inverter circuit 1504.

Thus, providing the added resistors R1, R2 in the SRAM bit cell 1500 in FIG. 15 has the effect of increasing the voltage gain of its inverter and complement inverter circuits 1504T, 1504C to further increase and enhance any imbalance between the inverter and complement inverter circuits 1504T, 1504C. This added passive resistance can make the SRAM bit cell 1500 generate a more reproducibly consistent output as a PUF output. In one example, each of the resistances of resistors R1 and R2 can be between approximately 1 and 15 kOhms when in a P magnetic orientation, and between approximately 2 and 30 kOhms when in an AP magnetic orientation, as non-limiting examples.

In the example of the SRAM bit cell 1500 in FIG. 15, the added resistors R1, R2 are not coupled to the source S of the pull-down and complement pull-down NFETs 1516N(T), 1516N(C) between their source S and the voltage rail 1506N due to the source degeneration effect in a common source amplifier configuration. If an added source resistance were coupled to the source S of the pull-down and complement pull-down NFETs 1516N(T), 1516N(C), a voltage drop would occur across the added source resistances as a result of an input voltage $V_{IN}$ applied to the respective input nodes 1508T, 1508C to make the pull-down and complement pull-down NFETs 1516N(T), 1516N(C) operate more linearly. This is because the drain current $I_D$ is a square of the difference between an input voltage $V_{IN}$ applied to the respective input and complement input nodes 1508T, 1508C and an output voltage $V_{OUT}$ on the respective output and complement output nodes 1510T, 1510C. To enhance the imbalance between the inverter and complement inverter circuits 1504T, 1504C in the SRAM bit cell 1500 in FIG. 15, it is desired for the pull-down and complement pull-down NFETs 1516N(T), 1516N(C) to have a non-linear gain.

Figure 17:
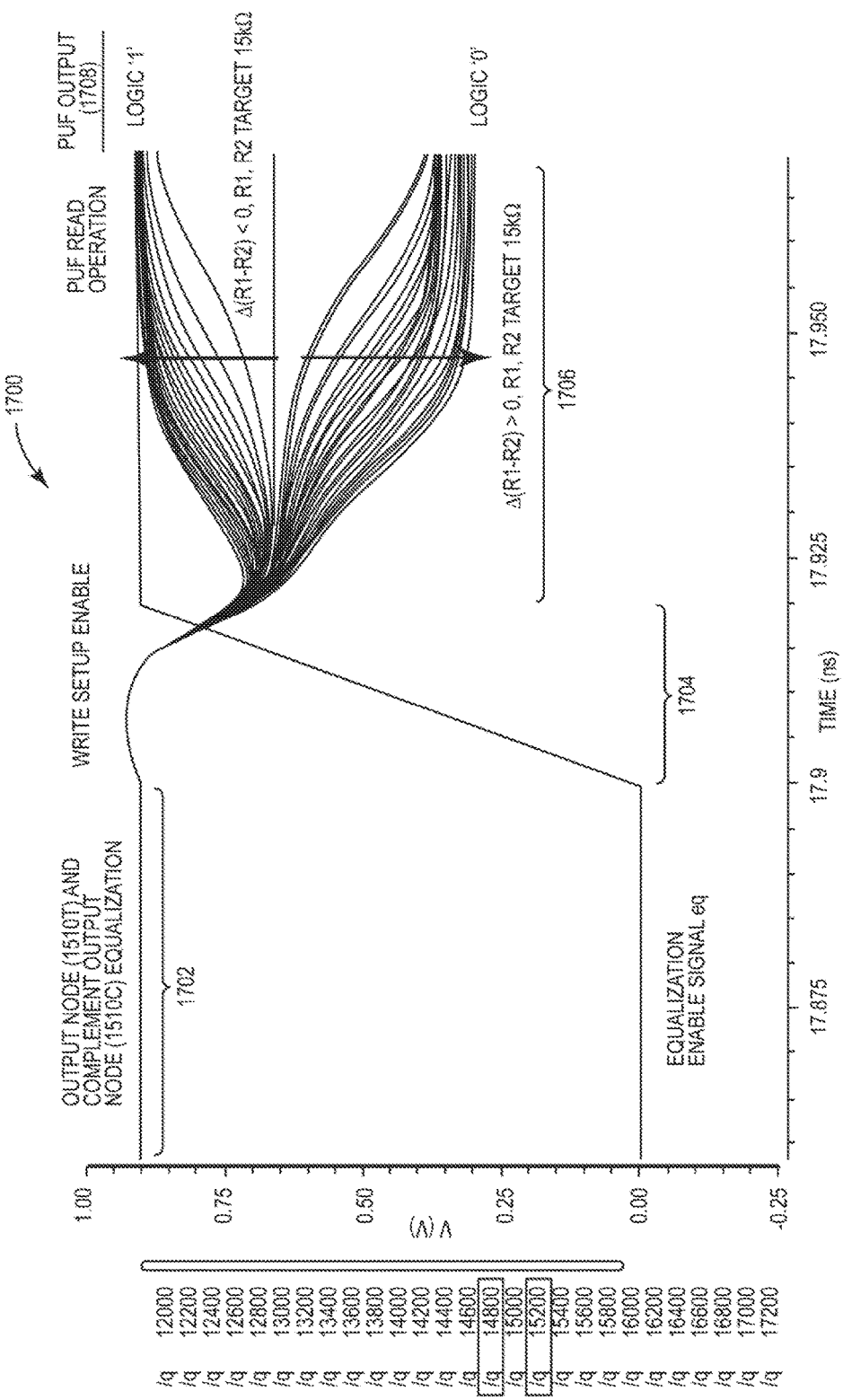
FIG. 17 is a graph illustrating exemplary Monte-Carlo simulated PUF outputs from an output node of the SRAM bit cell in FIG. 15 based on a mismatch between added passive resistance.

FIG. 17 is a graph 1700 illustrating an exemplary Monte-Carlo simulated PUF output 1708 from output node 1510T of the SRAM bit cell 1500 in FIG. 15 based on a mismatch between added passive resistance. As shown therein, in an equalization phase 1702, the equalization enable signal eq in an equalization enable state is asserted to the equalization input 1534 of the equalization circuit 1530 to couple the output node 1510T and complement output node 1510C together. The graph 1700 also shows a write setup enable phase 1704 after PUF read operation after the equalization enable signal eq is asserted in an equalization disable state. The PUF output 1708 on the output node 1510T moving to a logic '1' state in an output phase 1706 is shown with a mismatch in resistance of the resistors R1, R2 (e.g., a target resistance of 15 kOhms) less than 0 kOhms (i.e., resistance of R1<resistance of R2) due to the enhanced imbalance of the SRAM bit cell 1500. The PUF output 1708 on the output node 1510T moving to a logic '0' state is shown with a mismatch in resistance of the resistors R1, R2 (e.g., a target resistance of 15 kOhms) greater than 0 kOhms (i.e., resistance of R1>resistance of R2) due to the enhanced imbalance of the SRAM bit cell 1500.

As another example, the resistors R1, R2 in the SRAM bit cell 1500 in FIG. 15 could be resistive RAM (RRAM) circuits, also known as RRAM. As an example, a resistance of the RRAM as resistor R1 could be between approximately 0.1 kOhms and 100 kOhms when the RRAM as resistor R1 is activated (i.e., when conductive path filament is formed), and between approximately 1,000 kOhms and 1,000,000 kOhms when the RRAM as resistor R1 is not activated (i.e., when conductive path filament is not formed). As another example, a resistance of the complement RRAM as resistor R2 could be between approximately 0.1 kOhms and 100 kOhms when the complement RRAM as resistor R2 is activated, and between approximately 1000 kOhms and 1,000,000 kOhms when the complement RRAM as resistor R2 is not activated.

A PUF circuit that includes a PUF memory, including but not limited to the PUF memory 400 in FIG. 4 that can include any of the SRAM bit cells 500, 1300, 1500 in FIGS. 5, 13, and/or 15 with passive resistance added in the SRAM bit cells to enhance imbalance between transistors of the SRAM bit cells for improved PUF output reproducibility, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 18:
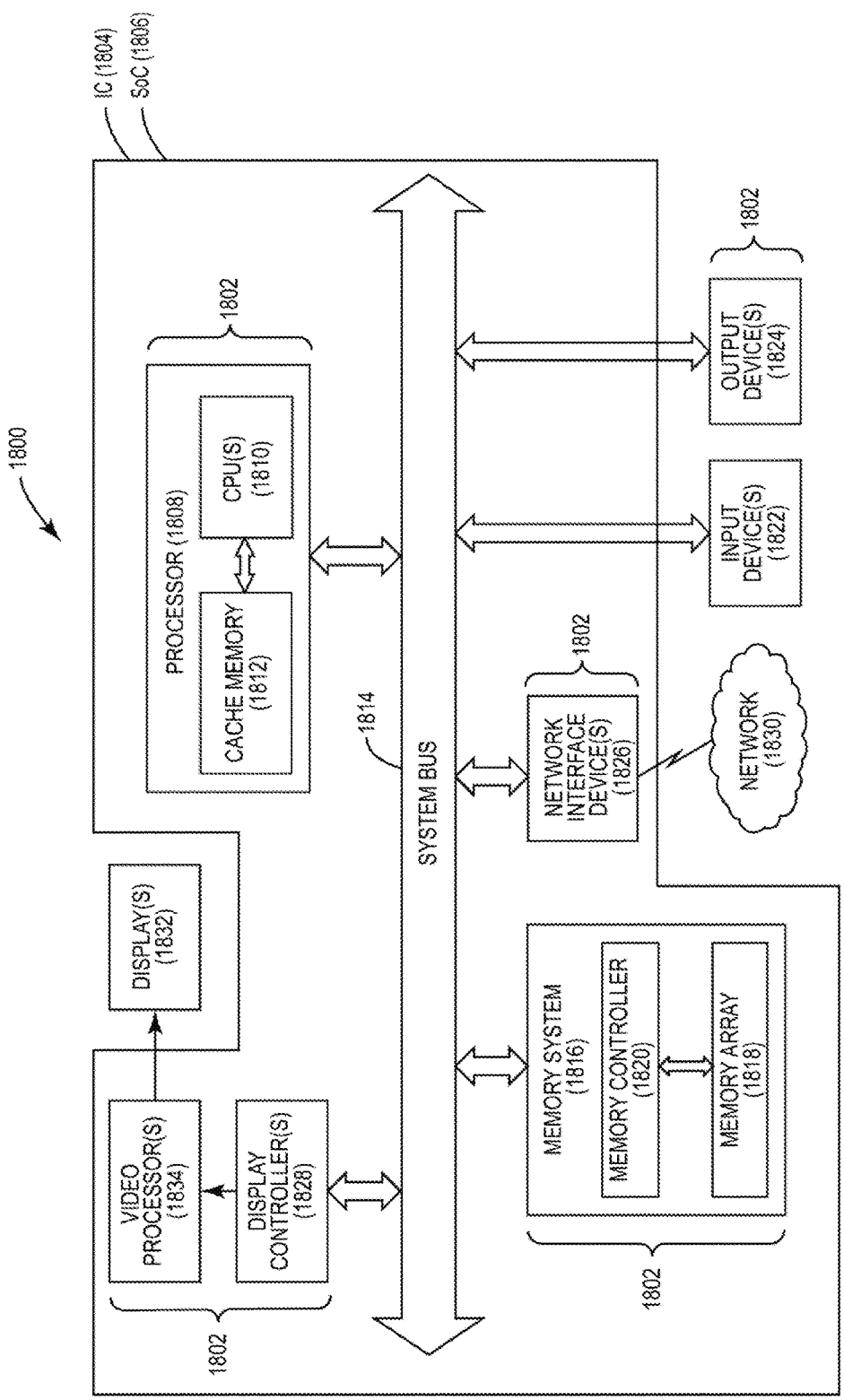
FIG. 18 is a block diagram of an exemplary processor-based system that can include a PUF circuit that includes a PUF memory, including but not limited to the PUF memory in FIG. 4 that can include any of the SRAM bit cells in FIGS. 5, 13, and/or 15 with passive resistance added in the SRAM bit cells to enhance imbalance between transistors of the SRAM bit cells for improved PUF output reproducibility.

In this regard, FIG. 18 illustrates an example of a processor-based system 1800 that can include a PUF circuit 1802 that includes a PUF memory, including but not limited to the PUF memory 400 in FIG. 4 that can include any of the SRAM bit cells 500, 1300, 1500 in FIGS. 5, 13, and/or 15 with passive resistance added in the SRAM bit cells to enhance imbalance between transistors of the SRAM bit cells for improved PUF output reproducibility. In this example, the processor-based system 1800 is provided in an IC 1804. The IC 1804 may be included in or provided to a system-on-a-chip (SoC) 1806. The processor-based system 1800 includes a processor 1808 that includes one or more CPUs 1810. The processor 1808 may include a cache memory 1812 coupled to the CPU(s) 1810 for rapid access to temporarily stored data. The cache memory 1812 may include a PUF circuit 1802 that includes a PUF memory, including but not limited to the PUF memory 400 in FIG. 4 that can include any of the SRAM bit cells 500, 1300, 1500 in FIGS. 5, 13, and/or 15 with passive resistance added in the SRAM bit cells to enhance imbalance between transistors of the SRAM bit cells for improved PUF output reproducibility. The processor 1808 is coupled to a system bus 1814 and can intercouple master and slave devices included in the processor-based system 1800. As is well known, the processor 1808 communicates with these other devices by exchanging address, control, and data information over the system bus 1814. Although not illustrated in FIG. 18, multiple system buses 1814 could be provided, wherein each system bus 1814 constitutes a different fabric. For example, the processor 1808 can communicate bus transaction requests to a memory system 1816 as an example of a slave device. The memory system 1816 may include a memory array 1818 whose access is controlled by a memory controller 1820. The memory system 1816 may be or include a PUF circuit 1802 that includes a PUF memory, including but not limited to the PUF memory 400 in FIG. 4 that can include any of the SRAM bit cells 500, 1300, 1500 in FIGS. 5, 13, and/or 15 with passive resistance added in the SRAM bit cells to enhance imbalance between transistors of the SRAM bit cells for improved PUF output reproducibility.

Other master and slave devices can be connected to the system bus 1814. As illustrated in FIG. 18, these devices can include the memory system 1816, and one or more input devices 1822, which can include a PUF circuit 1802 that includes a PUF memory, including but not limited to the PUF memory 400 in FIG. 4 that can include any of the SRAM bit cells 500, 1300, 1500 in FIGS. 5, 13, and/or 15 with passive resistance added in the SRAM bit cells to enhance imbalance between transistors of the SRAM bit cells for improved PUF output reproducibility. The input device(s) 1822 can include any type of input device, including but not limited to input keys, switches, voice processors, etc. The other devices can also include one or more output devices 1824, and one or more network interface devices 1826, both of which can include a PUF circuit 1802 that includes a PUF memory, including but not limited to the PUF memory 400 in FIG. 4 that can include any of the SRAM bit cells 500, 1300, 1500 in FIGS. 5, 13, and/or 15 with passive resistance added in the SRAM bit cells to enhance imbalance between transistors of the SRAM bit cells for improved PUF output reproducibility. The output device(s) 1824 can include any type of output device, including but not limited to audio, video, other visual indicators, etc. The other devices can also include one or more display controllers 1828 as examples. The network interface device(s) 1826 can be any devices configured to allow exchange of data to and from a network 1830. The network 1830 can be any type of network, including but not limited to a wired or wireless network, a private or public network, a local area network (LAN), a wireless local area network (WLAN), a wide area network (WAN), a BLUETOOTH™ network, and the Internet. The network interface device(s) 1826 can be configured to support any type of communications protocol desired.

The processor 1808 may also be configured to access the display controller(s) 1828 over the system bus 1814 to control information sent to one or more displays 1832. The display controller(s) 1828 sends information to the display(s) 1832 to be displayed via one or more video processors 1834, which process the information to be displayed into a format suitable for the display(s) 1832. The display controller(s) 1828 and the video processor(s) 1834 can include a PUF circuit 1802 that includes a PUF memory, including but not limited to the PUF memory 400 in FIG. 4 that can include any of the SRAM bit cells 500, 1300, 1500 in FIGS. 5, 13, and/or 15 with passive resistance added in the SRAM bit cells to enhance imbalance between transistors of the SRAM bit cells for improved PUF output reproducibility. The display(s) 1832 can include any type of display, including but not limited to a cathode ray tube (CRT), a liquid crystal display (LCD), a plasma display, etc.

Figure 19:
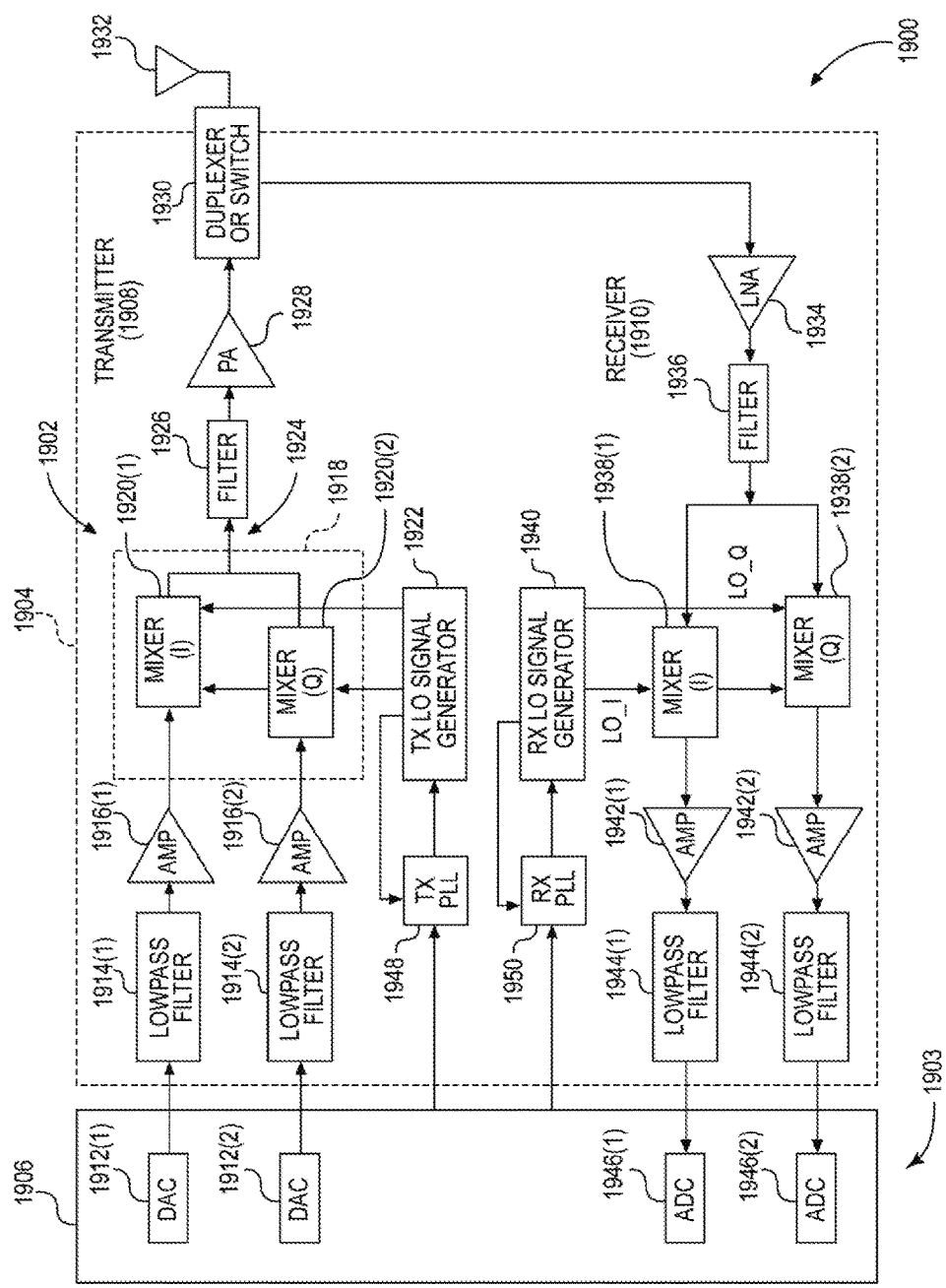
FIG. 19 is a block diagram of an exemplary wireless communications device that includes radio frequency (RF) components formed in an integrated circuit (IC), wherein any of the components therein can include a PUF circuit that includes a PUF memory, including but not limited to the PUF memory in FIG. 4 that can include any of the SRAM bit cells in FIGS. 5, 13, and/or 15 with passive resistance added in the SRAM bit cells to enhance imbalance between transistors of the SRAM bit cells for improved PUF output reproducibility.

FIG. 19 illustrates an exemplary wireless communications device 1900 that includes radio frequency (RF) components formed in an IC 1902, wherein any of the components therein can include a PUF circuit 1903 that includes a PUF memory, including but not limited to the PUF memory 400 in FIG. 4 that can include any of the SRAM bit cells 500, 1300, 1500 in FIGS. 5, 13, and/or 15 with passive resistance added in the SRAM bit cells to enhance imbalance between transistors of the SRAM bit cells for improved PUF output reproducibility.

In this regard, the wireless communications device 1900 may be provided in the IC 1902. The wireless communications device 1900 may include or be provided in any of the above referenced devices, as examples. As shown in FIG. 19, the wireless communications device 1900 includes a transceiver 1904 and a data processor 1906. The data processor 1906 may include a memory to store data and program codes. The transceiver 1904 includes a transmitter 1908 and a receiver 1910 that support bi-directional communications. In general, the wireless communications device 1900 may include any number of transmitters 1908 and/or receivers 1910 for any number of communication systems and frequency bands. All or a portion of the transceiver 1904 may be implemented on one or more analog ICs, RF ICs (RFICs), mixed-signal ICs, etc.

The transmitter 1908 or the receiver 1910 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 1910. In the direct-conversion architecture, a signal is frequency-converted between RF and baseband in one stage. The super-heterodyne and direct-conversion architectures may use different circuit blocks and/or have different requirements. In the wireless communications device 1900 in FIG. 19, the transmitter 1908 and the receiver 1910 are implemented with the direct-conversion architecture.

In the transmit path, the data processor 1906 processes data to be transmitted and provides I and Q analog output signals to the transmitter 1908. In the exemplary wireless communications device 1900, the data processor 1906 includes digital-to-analog converters (DACs) 1912(1), 1912(2) for converting digital signals generated by the data processor 1906 into the I and Q analog output signals, e.g., I and Q output currents, for further processing.

Within the transmitter 1908, lowpass filters 1914(1), 1914(2) filter the I and Q analog output signals, respectively, to remove undesired signals caused by the prior digital-to-analog conversion. Amplifiers (AMP) 1916(1), 1916(2) amplify the signals from the lowpass filters 1914(1), 1914(2), respectively, and provide I and Q baseband signals. An upconverter 1918 upconverts the I and Q baseband signals with I and Q transmit (TX) local oscillator (LO) signals through mixers 1920(1), 1920(2) from a TX LO signal generator 1922 to provide an upconverted signal 1924. A filter 1926 filters the upconverted signal 1924 to remove undesired signals caused by the frequency upconversion as well as noise in a receive frequency band. A power amplifier (PA) 1928 amplifies the upconverted signal 1924 from the filter 1926 to obtain the desired output power level and provides a transmit RF signal. The transmit RF signal is routed through a duplexer or switch 1930 and transmitted via an antenna 1932.

In the receive path, the antenna 1932 receives signals transmitted by base stations and provides a received RF signal, which is routed through the duplexer or switch 1930 and provided to a low noise amplifier (LNA) 1934. The duplexer or switch 1930 is designed to operate with a specific receive (RX)-to-TX duplexer frequency separation, such that RX signals are isolated from TX signals. The received RF signal is amplified by the LNA 1934 and filtered by a filter 1936 to obtain a desired RF input signal. Downconversion mixers 1938(1), 1938(2) mix the output of the filter 1936 with I and Q RX LO signals (i.e., LO_I and LO_Q) from an RX LO signal generator 1940 to generate I and Q baseband signals. The I and Q baseband signals are amplified by amplifiers (AMP) 1942(1), 1942(2) and further filtered by lowpass filters 1944(1), 1944(2) to obtain I and Q analog input signals, which are provided to the data processor 1906. In this example, the data processor 1906 includes ADCs 1946(1), 1946(2) for converting the analog input signals into digital signals to be further processed by the data processor 1906.

In the wireless communications device 1900 of FIG. 19, the TX LO signal generator 1922 generates the I and Q TX LO signals used for frequency upconversion, while the RX LO signal generator 1940 generates the I and Q RX LO signals used for frequency downconversion. Each LO signal is a periodic signal with a particular fundamental frequency. A TX phase-locked loop (PLL) circuit 1948 receives timing information from the data processor 1906 and generates a control signal used to adjust the frequency and/or phase of the TX LO signals from the TX LO signal generator 1922. Similarly, an RX PLL circuit 1950 receives timing information from the data processor 1906 and generates a control signal used to adjust the frequency and/or phase of the RX LO signals from the RX LO signal generator 1940.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A static random access memory (SRAM) bit cell, comprising:
    a storage circuit, comprising:
       an input node;
       an output node; and
       a pull-down circuit coupled to the input node, the output node, and a voltage rail;
    a complement storage circuit, comprising:
       a complement input node coupled to the output node of the storage circuit;
       a complement output node coupled to the input node of the storage circuit; and
       a complement pull-down circuit coupled to the complement input node, the complement output node, and the voltage rail;
    a passive resistance circuit having a resistance, the passive resistance circuit coupled to the pull-down circuit; and
    a complement passive resistance circuit having a complement resistance, the complement passive resistance circuit coupled to the complement pull-down circuit;
    wherein:
       the storage circuit comprises an inverter circuit further comprising a pull-up circuit coupled to the input node, the output node, and a positive voltage rail;
       the complement storage circuit comprises a complement inverter circuit further comprising a complement pull-up circuit coupled to the complement input node, the complement output node, and the positive voltage rail;
       the passive resistance circuit is further coupled to the pull-up circuit;
       the complement passive resistance circuit is further coupled to the complement pull-up circuit;
       the passive resistance circuit is coupled between the pull-up circuit and the output node; and
       the complement passive resistance circuit is coupled between the complement pull-up circuit and the complement output node.

2. The SRAM bit cell of claim 1, wherein:
the passive resistance circuit is not directly coupled to the voltage rail; and
the complement passive resistance circuit is not directly coupled to the voltage rail.

3. The SRAM bit cell of claim 1, further comprising:
an access circuit coupled to the output node; and
a complement access circuit coupled to the complement output node.

4. The SRAM bit cell of claim 3, wherein:
the access circuit comprises an access transistor comprising a gate coupled to a word line, a first electrode coupled to a bit line, and a second electrode coupled to the output node, the access transistor configured to:
    couple the bit line to the output node in response to a word line signal on the word line indicating a word line enable state; and
    decouple the bit line from the output node in response to the word line signal on the word line indicating a word line disable state; and
the complement access circuit comprises a complement access transistor comprising a gate coupled to the word line, a first electrode coupled to a complement bit line, and a second electrode coupled to the complement output node, the complement access transistor configured to:
    couple the complement bit line to the complement output node in response to the word line signal on the word line indicating the word line enable state; and
    decouple the complement bit line from the complement output node in response to the word line signal on the word line indicating the word line disable state.

5. The SRAM bit cell of claim 1, wherein:
the passive resistance circuit comprises a resistor; and
the complement passive resistance circuit comprises a complement resistor.

6. The SRAM bit cell of claim 5, wherein:
a resistance of the resistor is between approximately 0.10 killiOhms (kOhms) and 20 kOhms; and
a resistance of the complement resistor is between approximately 0.10 kOhms and 20 kOhms.

7. The SRAM bit cell of claim 1, wherein:
the passive resistance circuit comprises a magnetic tunnel junction (MTJ) comprising a pinned magnetization layer, a free magnetization layer, and a tunnel barrier disposed between and coupled to the pinned magnetization layer and the free magnetization layer; and
the complement passive resistance circuit comprises a complement MTJ comprising a complement pinned magnetization layer, a complement free magnetization layer, and a complement tunnel barrier disposed between and coupled to the complement pinned magnetization layer and the complement free magnetization layer.

8. The SRAM bit cell of claim 7, wherein:
a resistance of the MTJ is between approximately 1 kOhm and 15 kOhms when the pinned magnetization layer and the free magnetization layer are in a parallel (P) magnetic orientation to each other, and is between approximately 2 kOhms and 30 kOhms when the pinned magnetization layer and the free magnetization layer are in an anti-parallel (AP) magnetic orientation to each other; and
a resistance of the complement MTJ is between approximately 1 kOhm and 15 kOhms when the complement pinned magnetization layer and the complement free magnetization layer are in a P magnetic orientation to each other, and is between approximately 2 kOhms and 30 kOhms when the complement pinned magnetization layer and the complement free magnetization layer are in an AP magnetic orientation to each other.

9. The SRAM bit cell of claim 1, wherein:
the passive resistance circuit comprises a resistive RAM (RRAM); and
the complement passive resistance circuit comprises a complement RRAM.

10. The SRAM bit cell of claim 9, wherein:
a resistance of the RRAM is between approximately 0.1 kOhms and 100 kOhms when the RRAM is activated, and is between approximately 1,000 kOhms and 1,000,000 kOhms when the RRAM is not activated; and
a resistance of the complement RRAM is between approximately 0.1 kOhms and 100 kOhms when the complement RRAM is activated, and is between approximately 1,000 kOhms and 1,000,000 kOhms when the complement RRAM is not activated.

11. The SRAM bit cell of claim 1, wherein:
the pull-down circuit comprises a N-type Field-Effect Transistor (FET) (NFET) comprising a gate coupled to the input node, a drain coupled to the voltage rail, and a source coupled to the output node; and
the complement pull-down circuit comprises a complement NFET comprising a gate coupled to the complement input node, a drain coupled to the voltage rail, and a source coupled to the complement output node.

12. The SRAM bit cell of claim 11, wherein:
the passive resistance circuit is not coupled to the source of the NFET; and
the complement passive resistance circuit is not coupled to the source of the complement NFET.

13. The SRAM bit cell of claim 1, wherein:
the pull-up circuit comprises a P-type FET (PFET) comprising a gate coupled to the input node, a drain coupled to the output node, and a source coupled to the positive voltage rail; and
the complement pull-up circuit comprises a complement PFET comprising a gate coupled to the complement input node, a drain coupled to the complement output node, and a source coupled to the positive voltage rail.

14. The SRAM bit cell of claim 1, further comprising a read enable control circuit comprising a read enable input and coupled to the voltage rail and a ground node, the read enable control circuit configured to:
couple the voltage rail and the ground node in response to a read enable signal on the read enable input indicating a read enable state; and
decouple the voltage rail from the ground node in response to the read enable signal on the read enable input indicating a read disable state.

15. The SRAM bit cell of claim 1, further comprising an equalization circuit comprising an equalization input and coupled to the input node and the complement input node, the equalization circuit configured to:
couple the input node to the complement input node in response to an equalization enable signal on the equalization input indicating an equalization enable state; and
decouple the input node from the complement input node in response to the equalization enable signal on the equalization input indicating an equalization disable state.

16. The SRAM bit cell of claim 1 integrated into an integrated circuit (IC).

17. The SRAM bit cell of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

18. A method of generating a physically unclonable function (PUF) response output from a PUF memory array comprising a plurality of memory bit cell row circuits each comprising a plurality of static random access memory (SRAM) bit cells, and a plurality of memory bit cell column circuits each comprising an SRAM bit cell from a memory bit cell row circuit among the plurality of memory bit cell row circuits, the method comprising:
selecting at least one SRAM bit cell in a memory bit cell row circuit among the plurality of memory bit cell row circuits to be read based on a memory read address in response to a PUF read operation, wherein the plurality of SRAM bit cells each comprise:
a storage circuit, comprising:
an input node;
an output node; and
a pull-down circuit coupled to the input node, the output node, and a voltage rail;
a complement storage circuit, comprising:
a complement input node coupled to the output node of the storage circuit;
a complement output node coupled to the input node of the storage circuit; and
a complement pull-down circuit coupled to the complement input node, the complement output node, and the voltage rail;

a passive resistance circuit having a resistance, the passive resistance circuit coupled to the pull-down circuit; and a complement passive resistance circuit having a complement resistance, the complement passive resistance circuit coupled to the complement pull-down circuit;

generating a data output indicating a memory state from the selected at least one SRAM bit cell in response to the PUF read operation;

determining a logic state skew of the selected at least one SRAM bit cell based on the data output; and programming resistances of the passive resistance circuit and the complement passive resistance circuit in the selected at least one SRAM bit cell to a memory state based on the determined logic state skew.

19. The method of claim 18, further comprising:
selecting at least one SRAM bit cell in a memory bit cell row circuit among the plurality of memory bit cell row circuits to be written based on a memory write address in response to a PUF write operation; and
writing write data to the selected at least one SRAM bit cell in response to the PUF write operation.

20. The method of claim 18, further comprising writing a memory state to the selected at least one SRAM bit cell based on the determined logic state skew.

21. The method of claim 20, further comprising performing the PUF read operation to the selected at least one SRAM bit cell after writing the memory state to the selected at least one SRAM bit cell based on the determined logic state skew.

22. The method of claim 18, further comprising:
repeatedly:
selecting the at least one SRAM bit cell in a memory bit cell row circuit among the plurality of memory bit cell row circuits to be read;
generating the data output indicating the memory state from the selected at least one SRAM bit cell in response to the PUF read operation;
determining the logic state skew of the selected at least one SRAM bit cell; and
writing the memory state to the selected at least one SRAM bit cell based on the determined logic state skew.

23. A physically unclonable function (PUF) memory, comprising:
a PUF memory array, comprising:
a plurality of PUF bit cell row circuits each comprising a plurality of static random access memory (SRAM) bit cells, each SRAM bit cell among the plurality of SRAM bit cells comprising:
a storage circuit, comprising:
an input node;
an output node; and
a pull-down circuit coupled to the input node, the output node, and a voltage rail;
a complement storage circuit, comprising:
a complement input node coupled to the output node of the storage circuit;
a complement output node coupled to the input node of the storage circuit; and
a complement pull-down circuit coupled to the complement input node, the complement output node, and the voltage rail;
a passive resistance circuit having a resistance, the passive resistance circuit coupled to the pull-down circuit; and a complement passive resistance circuit having a complement resistance, the complement passive resistance circuit coupled to the complement pull-down circuit;
wherein:
the storage circuit comprises an inverter circuit further comprising a pull-up circuit coupled to the input node, the output node, and a positive voltage rail;
the complement storage circuit comprises a complement inverter circuit further comprising a complement pull-up circuit coupled to the complement input node, the complement output node, and the positive voltage rail;
the passive resistance circuit is further coupled to the pull-up circuit;
the complement passive resistance circuit is further coupled to the complement pull-up circuit;
the passive resistance circuit is coupled between the pull-up circuit and the output node; and
the complement passive resistance circuit is coupled between the complement pull-up circuit and the complement output node; and
a plurality of PUF bit cell column circuits each comprising an SRAM bit cell among the plurality of SRAM bit cells from a memory bit cell row circuit among the plurality of memory bit cell row circuits; and
a PUF output coupled to the PUF memory array;
the PUF memory array configured to generate a data output on the PUF output based on a memory state in at least one SRAM bit cell among the plurality of SRAM bit cells accessed in a PUF read operation to the PUF memory array.

24. The PUF memory of claim 23, further comprising:
a positive supply voltage rail configured to receive a positive supply voltage, the positive supply voltage rail coupled to each of the plurality of SRAM bit cells in the PUF memory array;
a supply voltage rail coupled to each of the plurality of SRAM bit cells in the PUF memory array;
a plurality of word lines, each word line among the plurality of word lines coupled to a PUF bit cell row circuit among the plurality of PUF bit cell row circuits each comprising the plurality of SRAM bit cells;
a plurality of bit lines, each bit line among the plurality of bit lines coupled to a PUF bit cell column circuit among the plurality of PUF bit cell column circuits; and
a plurality of complement bit lines, each complement bit line among the plurality of complement bit lines coupled to the PUF bit cell column circuit among the plurality of PUF bit cell column circuits.

25. The PUF memory of claim 23, wherein, for each SRAM bit cell among the plurality of SRAM bit cells:
the passive resistance circuit is not directly coupled to the voltage rail; and
the complement passive resistance circuit is not directly coupled to the voltage rail.

26. A physically unclonable function (PUF) memory comprising:
a PUF memory array, comprising:
a plurality of PUF bit cell row circuits each comprising a plurality of static random access memory (SRAM) bit cells, each SRAM bit cell among the plurality of SRAM bit cells comprising:
a storage circuit, comprising:
an input node;

an output node; and
a pull-down circuit coupled to the input node, the output node, and a voltage rail;
a complement storage circuit, comprising:
a complement input node coupled to the output node of the storage circuit;
a complement output node coupled to the input node of the storage circuit; and
a complement pull-down circuit coupled to the complement input node, the complement output node, and the voltage rail;
a passive resistance circuit having a resistance, the passive resistance circuit coupled to the pull-down circuit; and
a complement passive resistance circuit having a complement resistance, the complement passive resistance circuit coupled to the complement pull-down circuit; wherein:
the passive resistance circuit is coupled between the pull-down circuit and the output node; and
the complement passive resistance circuit is coupled between the complement pull-down circuit and the complement output node;
a plurality of PUF bit cell column circuits each comprising an SRAM bit cell among the plurality of SRAM bit cells from a memory bit cell row circuit among the plurality of memory bit cell row circuits; and
a PUF output coupled to the PUF memory array;
the PUF memory array configured to generate a data output on the PUF output based on a memory state in at least one SRAM bit cell among the plurality of SRAM bit cells accessed in a PUF read operation to the PUF memory array.

27. The PUF memory of claim 26, wherein for each SRAM bit cell among the plurality of SRAM bit cells:
the passive resistance circuit comprises a magnetic tunnel junction (MTJ) comprising a pinned magnetization layer, a free magnetization layer, and a tunnel barrier disposed between and coupled to the pinned magnetization layer and the free magnetization layer; and
the complement passive resistance circuit comprises a complement MTJ comprising a complement pinned magnetization layer, a complement free magnetization layer, and a complement tunnel barrier disposed between and coupled to the complement pinned magnetization layer and the complement free magnetization layer.

28. The PUF memory of claim 27, wherein:
a resistance of the MTJ is between approximately 1 kOhm and 15 kOhms when the pinned magnetization layer and the free magnetization layer are in a parallel (P) magnetic orientation to each other, and is between approximately 2 kOhms and 30 kOhms when the pinned magnetization layer and the free magnetization layer are in an anti-parallel (AP) magnetic orientation to each other; and
a resistance of the complement MTJ is between approximately 1 kOhm and 15 kOhms when the complement pinned magnetization layer and the complement free magnetization layer are in a P magnetic orientation to each other, and is between approximately 2 kOhms and 30 kOhms when the complement pinned magnetization layer and the complement free magnetization layer are in an AP magnetic orientation to each other.

29. A physically unclonable function (PUF) memory comprising:

a PUF memory array, comprising:
a plurality of PUF bit cell row circuits each comprising a plurality of static random access memory (SRAM) bit cells, each SRAM bit cell among the plurality of SRAM bit cells comprising:
a storage circuit, comprising:
an input node;
an output node; and
a pull-down circuit coupled to the input node, the output node, and a voltage rail;
a complement storage circuit, comprising:
a complement input node coupled to the output node of the storage circuit;
a complement output node coupled to the input node of the storage circuit; and
a complement pull-down circuit coupled to the complement input node, the complement output node, and the voltage rail;
a passive resistance circuit having a resistance, the passive resistance circuit coupled to the pull-down circuit; and
a complement passive resistance circuit having a complement resistance, the complement passive resistance circuit coupled to the complement pull-down circuit;
wherein:
the passive resistance circuit is further coupled to a positive voltage rail; and
the complement passive resistance circuit is further coupled to the positive voltage rail;
a plurality of PUF bit cell column circuits each comprising an SRAM bit cell among the plurality of SRAM bit cells from a memory bit cell row circuit among the plurality of memory bit cell row circuits; and
a PUF output coupled to the PUF memory array;
the PUF memory array configured to generate a data output on the PUF output based on a memory state in at least one SRAM bit cell among the plurality of SRAM bit cells accessed in a PUF read operation to the PUF memory array.

30. The PUF memory of claim 29, wherein for each SRAM bit cell among the plurality of SRAM bit cells:
the passive resistance circuit comprises a magnetic tunnel junction (MTJ) comprising a pinned magnetization layer, a free magnetization layer, and a tunnel barrier disposed between and coupled to the pinned magnetization layer and the free magnetization layer; and
the complement passive resistance circuit comprises a complement MTJ comprising a complement pinned magnetization layer, a complement free magnetization layer, and a complement tunnel barrier disposed between and coupled to the complement pinned magnetization layer and the complement free magnetization layer.

31. The PUF memory of claim 30, wherein:
a resistance of the MTJ is between approximately 1 kOhm and 15 kOhms when the pinned magnetization layer and the free magnetization layer are in a parallel (P) magnetic orientation to each other, and is between approximately 2 kOhms and 30 kOhms when the pinned magnetization layer and the free magnetization layer are in an anti-parallel (AP) magnetic orientation to each other; and
a resistance of the complement MTJ is between approximately 1 kOhm and 15 kOhms when the complement pinned magnetization layer and the complement free magnetization layer are in a P magnetic orientation to each other, and is between approximately 2 kOhms and 30 kOhms when the complement pinned magnetization layer and the complement free magnetization layer are in an AP magnetic orientation to each other.

* * * * *